United States Patent
Chetty

(10) Patent No.: US 7,353,014 B2
(45) Date of Patent: Apr. 1, 2008

(54) UNIVERSAL PORTABLE UNIT

(75) Inventor: Vijay Raghavan Chetty, 910 19th St., Unit 106, Santa Monica, CA (US) 90403

(73) Assignee: Vijay Raghavan Chetty, Santa Monica, CA (US)

( * ) Notice: Subject to any disclaimer, the term of this patent is extended or adjusted under 35 U.S.C. 154(b) by 1168 days.

(21) Appl. No.: 09/829,858

(22) Filed: Apr. 9, 2001

(65) Prior Publication Data

US 2002/0052193 A1 May 2, 2002

Related U.S. Application Data

(60) Provisional application No. 60/244,847, filed on Oct. 31, 2000.

(51) Int. Cl.
*H04Q 7/20* (2006.01)

(52) U.S. Cl. .......... 455/412.1; 455/410; 455/411; 455/406; 455/407; 455/408; 455/422.1; 455/414.1; 235/380; 235/382; 235/382.5; 705/50; 705/59; 705/43; 705/62; 705/72; 705/67; 379/114.01; 379/127.02; 379/145

(58) Field of Classification Search ........ 455/403, 455/406–408, 422.1, 414.1–414.4, 426.1, 455/426.2, 410, 411, 435.1, 550.1, 500, 517, 455/445, 566, 557, 418, 419, 420, 412.1, 455/412.2, 405, 73; 235/380, 382, 382.5; 705/50, 59, 43, 62, 72, 67, 18, 44; 379/114.01, 379/127.02, 145

See application file for complete search history.

(56) References Cited

U.S. PATENT DOCUMENTS

| | | | |
|---|---|---|---|
| 5,337,358 A | 8/1994 | Axelrod et al. | |
| 5,359,182 A * | 10/1994 | Schilling | 235/380 |
| 5,590,197 A | 12/1996 | Chen et al. | |
| 5,665,953 A | 9/1997 | Mazzamuto et al. | |
| 5,712,914 A | 1/1998 | Aucsmith et al. | |
| 5,767,896 A | 6/1998 | Nemirofsky | |
| 5,878,144 A | 3/1999 | Aucsmith et al. | |
| 5,884,271 A | 3/1999 | Pitroda | |
| 5,886,333 A * | 3/1999 | Miyake | 235/380 |
| 5,903,880 A | 5/1999 | Biffar | |
| 6,026,166 A | 2/2000 | LeBourgeois | |
| 6,029,150 A | 2/2000 | Kravitz | |
| 6,032,859 A | 3/2000 | Muehlberger et al. | |
| 6,047,269 A | 4/2000 | Biffar | |
| 6,098,053 A | 8/2000 | Slater | |
| 6,114,960 A | 9/2000 | Gilmour | |
| 6,142,369 A | 11/2000 | Jonstromer | |
| 6,157,920 A | 12/2000 | Jakobsson et al. | |
| 6,202,055 B1 * | 3/2001 | Houvener et al. | 705/44 |
| 6,234,389 B1 * | 5/2001 | Valliani et al. | 235/380 |
| 6,315,195 B1 * | 11/2001 | Ramachandran | 235/380 |

(Continued)

*Primary Examiner*—Keith Ferguson
(74) *Attorney, Agent, or Firm*—Blakely, Sokoloff, Taylor & Zafman

(57) ABSTRACT

In general, a portable unit and method are described for storing user information for subsequent recovering. For one embodiment, the portable unit comprises a casing, an antenna and logic employed within the casing. The logic may comprise a wireless transceiver coupled to the antenna, a processing unit coupled to the wireless transceiver, and a remote transceiver coupled to a plurality of device drivers and a memory unit. The memory unit is configured to store remote codes, user identification information and user transaction information.

32 Claims, 16 Drawing Sheets

U.S. PATENT DOCUMENTS

| | | |
|---|---|---|
| 6,666,377 B1 * | 12/2003 | Harris .................. 235/462.25 |
| 6,895,419 B1 | 5/2005 | Cargin, Jr. et al. |
| 7,003,495 B1 * | 2/2006 | Burger et al. ................. 705/50 |
| 2002/0025796 A1 * | 2/2002 | Taylor et al. ............... 455/406 |
| 2002/0062284 A1 * | 5/2002 | Kawan ........................ 705/43 |
| 2002/0072349 A1 * | 6/2002 | Geiselman et al. ......... 455/411 |
| 2002/0099665 A1 * | 7/2002 | Burger et al. ................. 705/67 |
| 2002/0152123 A1 * | 10/2002 | Giordano et al. ............. 705/14 |

* cited by examiner

UNIVERSAL PORTABLE UNIT

This application claims the benefit of priority on U.S. Provisional Application No. 60/244,847.

FIELD

The present invention relates to the field of communications. In particular, this invention relates to a universal portable unit that provides digital identification and remote locking and unlocking functionality.

GENERAL BACKGROUND

In today's electronic world, individuals tend to carry a number of credit, debit and identification cards in their possession. For instance, many individuals commonly carry a drivers license or state identification cards, an automated teller machine (ATM) card, a membership card, a credit/debit card and an insurance card. Similarly, these individuals also carry a number of keys to open and close their home and office doors and carry remote controls in their possession to open and close their garage door and/or activate automobile theft control mechanisms. Clearly, it would be advantageous to eliminate the need for carrying all these cards, keys and remote controls in favor of consolidating these operations into a portable communication device.

BRIEF DESCRIPTION OF THE DRAWINGS

The features and advantages of the present invention will become apparent from the following detailed description of the present invention in which.

DETAILED DESCRIPTION

An exemplary embodiment of the invention relates to a universal portable unit and technique for downloading, storing, accessing and utilizing information for identification, commercial transactions and/or remote locking controls. This information may include, but is not limited or restricted to drivers license information, ATM, credit/debit card numbers and expiration dates, membership numbers, departmental store account numbers and the like. Herein, well-known circuits are not set forth in detail in order to avoid unnecessarily obscuring the invention.

In the following description, certain terminology is used to describe features of the invention. For example, a "processing unit" includes hardware controlled at least in part by software to perform certain operations. The software is executable code configured as an operating system, an application, or a downloadable applet, for instance. Examples of a processing unit include a digital signal processor, a general microprocessor, a micro-controller, a state machine, an application specific integrated circuit and the like. A "link" is broadly defined as one or more information-carrying mediums to establish a communication pathway. For instance, the information-carrying medium may support wireless communications (e.g., infrared "IR", laser, radio frequency "RF", cellular, satellite, etc.) or communications over physical medium such as electrical wire, optical fiber, cable, bus traces and the like.

In addition, the term "information" is defined as data (e.g., audio, video or text), address, and/or control. One type of information is denoted as "user information," namely information related to identification of the user or transactions involving the user. User information includes, but is not limited or restricted to "user identification information" and/or "user transaction information". For instance, user identification information includes drivers license data (name, address, age, date of birth, picture, drivers license number, biometrics data, expiration date, etc.), social security number, passport information, birth certificate data, corporate identification badge, school or library identification data, building access card, insurance card, frequent flier card and the like. User transaction information includes credit/debit/ATM card information such as the name on the card, picture of the card holder, card number, expiration date, and the like. For clarity, the user information stored or illustrated by a card (e.g., drivers license, social security, credit/debit/ATM card, membership card, insurance card, library card, state or student ID, retail store card, service station card, etc.) is referred to as "card information".

For transmission, the user information may be transmitted as a file (e.g., any selected grouping of information). The file may be a successive transfer of information packets, a stream of information, and the like.

Figure 1:
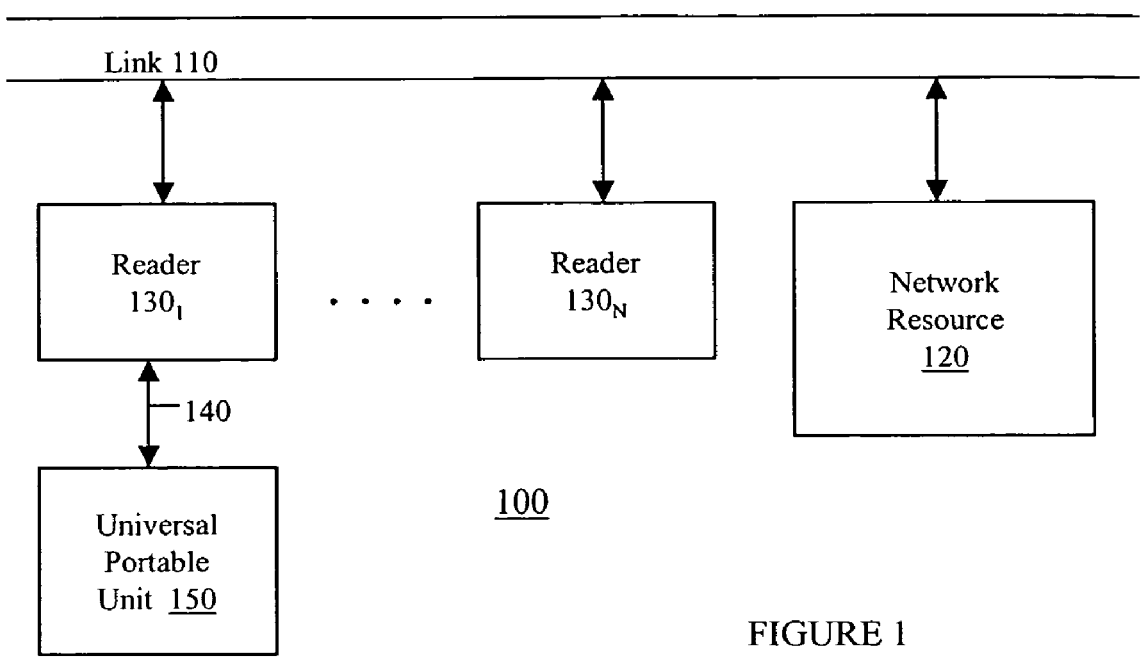
FIG. 1 is a first exemplary embodiment of a network in accordance with the invention.

Referring to FIG. 1, a first exemplary embodiment of a network 100 in accordance with the invention is illustrated. The network 100 comprises a link 110 based on a physical medium. Herein, the link 110 may be part of a wired or wireless backbone that includes a network resource 120. The network resource 120 is a server or other device capable of storing a database of all styles, models and various kinds of software, hardware and other features built into universal portable units from different manufacturers. The network 100 may further include one or more readers $130_1$-$130_N$ ("N" representing a positive whole number, $N \geq 1$) that support communications with one or more universal portable units 150 (hereinafter referred to as a "portable unit"). For this embodiment, the portable unit 150 communicates with the reader $130_1$ via a link 140.

The portable unit 150 includes any electronic device that comprises a processing unit (e.g., a processor, micro controller, state machine, etc.) and operates to provide user information and/or remote control key functionality as described below. The portable unit may be produced in a variety of form factors such as a mobile computer (e.g., a laptop computer, a hand-held inclusive of a personal digital assistant such as a PALM PILOT®, etc.), communications equipment (e.g., cellular telephone, mobile telephone, etc) or any other portable electronic device, for example.

The reader $130_x$ ("x"=1, . . . or N) is a device that provides bi-directional communications between one or more portable units, computers, networks or the wired backbone. An example of a reader includes a small, portable docking station and/or another portable unit suitably adapted to interface with the portable unit 150 and to read user information. This would allow authorized personnel (e.g., local police, governmental official, merchant, etc.) to retrieve the user information from the portable unit.

The reader may have a physical connection to the wired backbone (e.g., link 110) as illustrated by reader $130_1$ or a wireless connection back to the wired backbone as illustrated by reader $130_N$. The wired and/or wireless mode of operation may provide local area network (LAN) or wide area network (WAN) connectivity. The link 110 may be adapted for any network type, including Ethernet, token ring, asynchronous transfer mode and the like.

Figure 2:
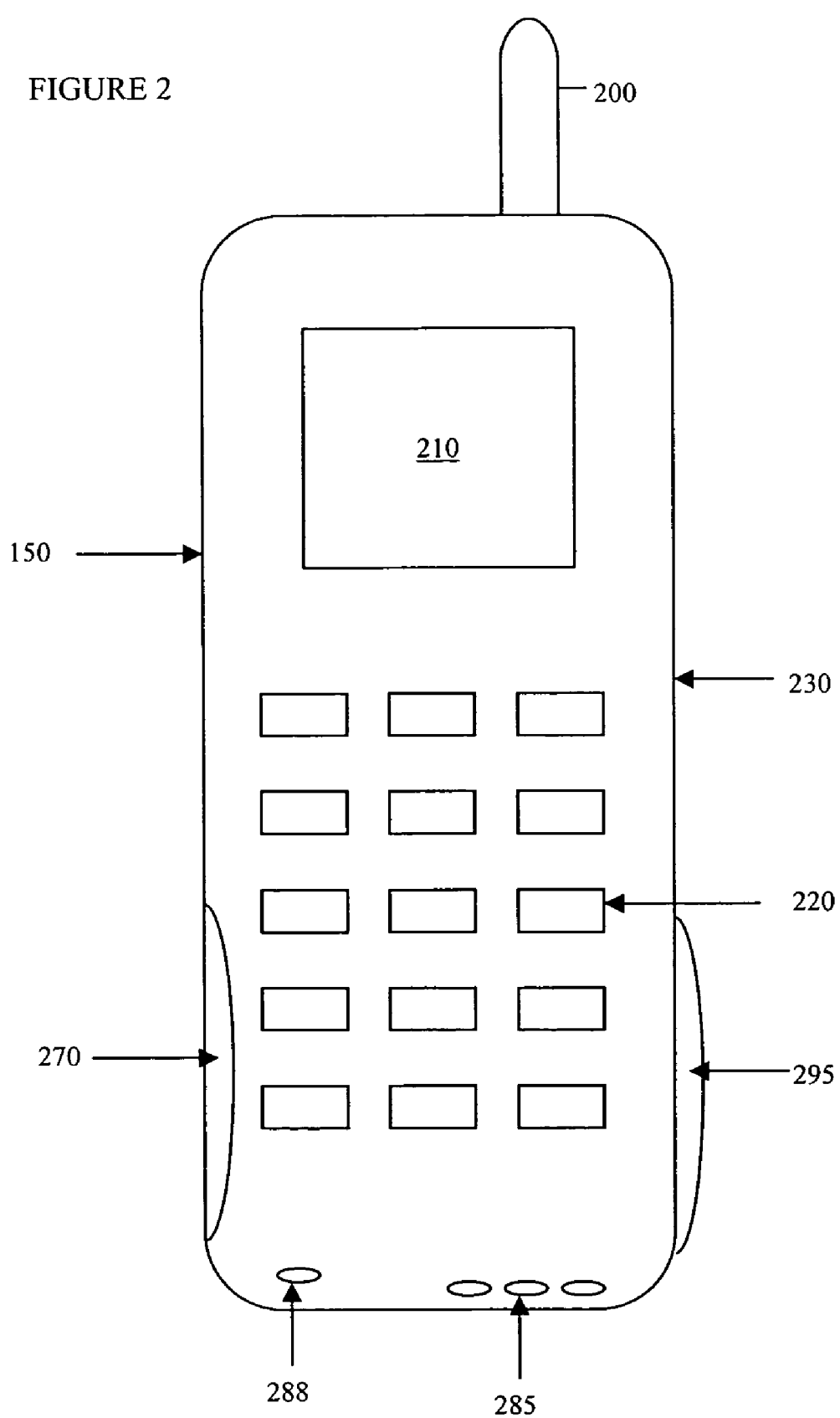
FIG. 2 is an exemplary embodiment of a portable unit of FIG. 1.

Referring now to FIG. 2, an exemplary embodiment of the portable unit 150 of FIG. 1 is shown. For illustrative purposes, the portable unit 150 comprises an antenna 200, a display 210 and an alphanumeric keypad 220 integrated with a casing 230. More specifically, the antenna 200 enables the reception of incoming information and the transmission of outgoing information. The display 210 may be a flat panel display such as a liquid crystal display for instance. While the display 210 may be used as an output device in one embodiment, it is contemplated that the display 210 may be used as an input/output device such as a touch screen display, thereby eliminating the need for the alphanumeric keypad 220. The casing 230 is made of an inflexible material such as hardened plastic. The casing 230 provides a barrier to protect logic placed therein from damage and contaminants.

Figure 3:
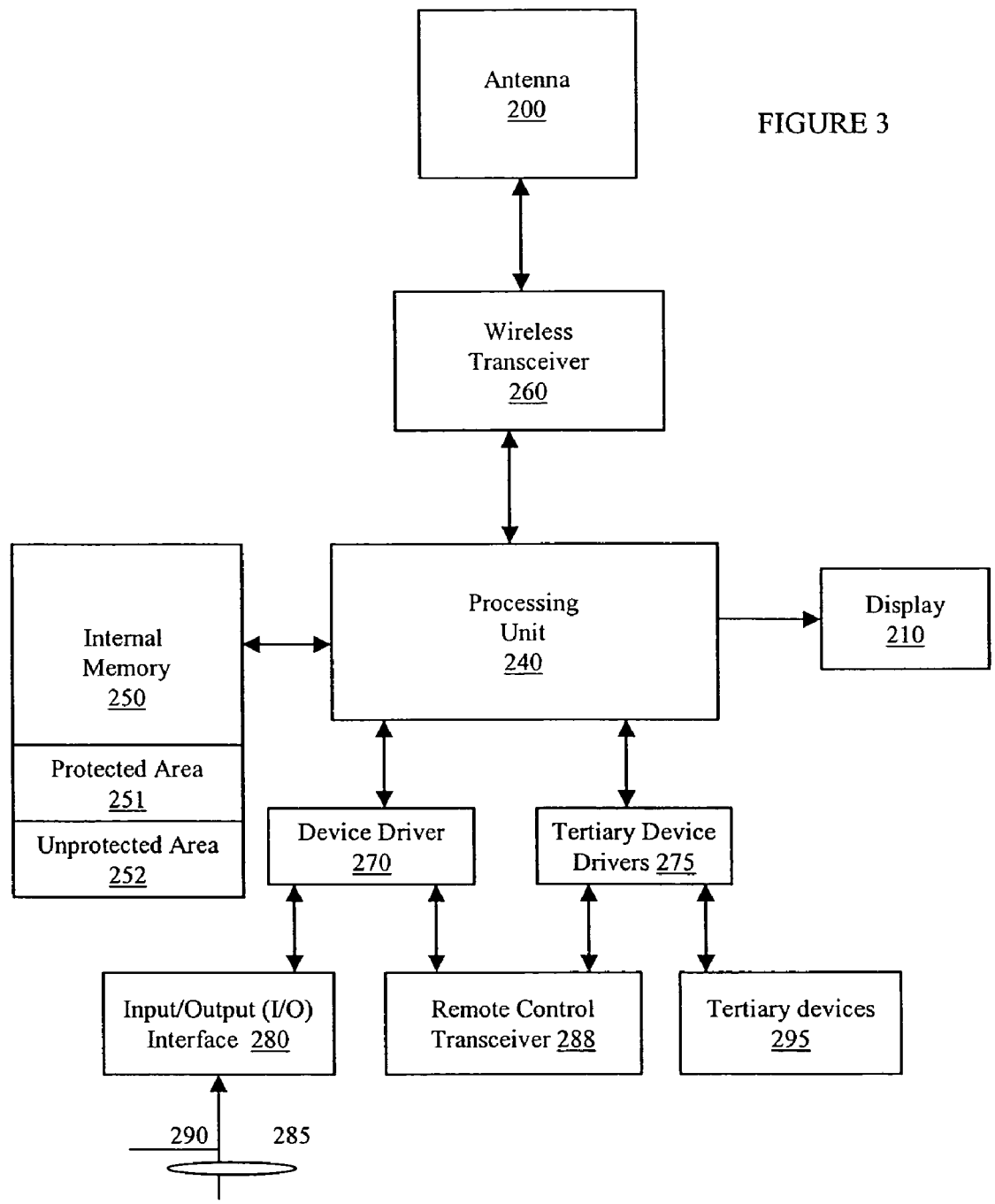
FIG. 3 is an exemplary embodiment of the general architecture of internal logic and the flow of information within the portable unit of FIG. 2.

FIG. 3 is an exemplary embodiment of the general architecture of internal logic and the flow of information within the portable unit of FIG. 2. For this embodiment, the portable unit 150 includes some or all of the following logic: antenna 200, a processing unit 240, an internal memory 250, a wireless transceiver 260, device driver 270, one or more optional tertiary device drivers 275, an input/output (I/O) interface 280 with one or more corresponding I/O ports 285, remote control transceiver 288, and tertiary devices 295 such as single inline module (SIM) cards or memory sticks for instance.

Coupled to the processing unit 240, the internal memory 250 may be implemented as non-volatile memory (e.g., flash, battery-backed random access memory "RAM", any type of read-only memory such as ROM, PROM, EPROM, etc.). Of course, in lieu of or in addition to non-volatile memory, the internal memory 250 may be implemented with volatile memory (e.g., dynamic RAM).

In one embodiment, the internal memory 250 is segmented into protected and non-protected areas 251 and 252. The non-protected area 252 may be configured to contain (i) transaction confirmations such as credit or debit card receipts and (ii) card information having a lower level of security (e.g., library card numbers, gym membership data, etc.). The non-protected area 252 may also be loaded with software that enables the processing unit 240 to packetize and depacketize data upon receipt or transmission over the wireless transceiver 260, the I/O interface 280 and/or the remote control transceiver 288. The protected area 251 may be configured to contain (i) user information (e.g., drivers license data, social security number, ATM/credit/debit card numbers and expiration dates etc.), and/or (ii) security features (e.g., remote control codes, user identification "UserID", password, digital signatures, digital certificates, etc.). The manner of delivering and/or retrieving user identification information or security features to/from the portable unit 150 is a design choice (e.g., using encryption, password control, etc.). The digital signatures and certificates may be used to protect the integrity and verify the authenticity of information stored within the internal memory 250 or information downloaded by the portable unit 150 via the antenna 200/wireless transceiver 260, the I/O interface 280 and/or the remote control transceiver 288.

If tertiary devices 295 and tertiary device drivers 275 are employed within the portable unit 150, memory associated with the tertiary devices 295 may be similarly segmented into protected and non-protected areas. Different types of information can be stored in these areas as described above. The use of tertiary devices 295 provides greater flexibility for use of the same user information or security features in more than one portable unit.

The wireless transceiver 260 is coupled to the processing unit 240 and the antenna 200. In cooperation with the processing unit 240, the wireless transceiver 260 controls the assembly/packetization of data packets transmitted and received over the antenna 200 as well as any encoding and decoding operations. Normally, this is accomplished by controlling the modulated frequency at the antenna 200. Thus, the portable unit 150 is capable of supporting Code Division Multiple Access (CDMA), Global System for Mobile Communications (GSM) and other types of wireless communication protocols.

As shown in FIG. 3, the I/O interface 280 provides one or more I/O ports 285 to establish communications with a destination device via a link having one end coupled to the I/O port 285 and another end coupled to the destination device. For example, in one embodiment, the I/O interface 280 includes an I/O port 285 that enables information to be transmitted to and/or received from a peripheral. The I/O port 285 may be configured as a serial port, a parallel port, a Universal Serial Bus (USB) port and the like. When a destination device, such as a printer for example, is coupled to the I/O interface 280 via a link 290, the user is able to print out receipts, confirmations and the like. Other types of destination devices that may be coupled to the I/O interface 280 include a facsimile machine, another reader, another portable unit, computer, network, Point-of-Sale (POS) system, ATM, modem (for wired web access), or any other peripheral configured appropriately.

In one embodiment of the invention, the remote control transceiver 288 may be coupled to the device driver 270 and/or tertiary device drivers 275. The remote control transceiver 288, which can be configured with memory for programmability, is capable of processing a variety of transmission formats such as any modulated signal, light pulses, or digital packet transmissions, for example.

Referring back to FIGS. 1 and 2, the reader 130$_1$ may be an ATM, POS system or another portable unit adapted to receive or obtain information stored internally within the casing 230 of the portable unit 150 or stored externally from the casing 230. The reader 130$_1$ includes either an interface to connect to an I/O port of the I/O interface 280 or a wireless receiver to communicate with the wireless transceiver 260 of the portable unit 150.

Referring back to FIG. 3, the processing unit 240 executes software responsible for (i) initializing, maintaining and controlling the display 210, the internal memory 250, the wireless transceiver 260, the remote control transceiver 288, the device driver 270 and/or the tertiary device drivers 275; (ii) executing all the standard and proprietary communication protocols needed for performing various portable unit functions; (iii) maintaining all the state information required by any communication protocols; (iv) transmitting, receiving, packetizing or depacketizing data; and (v) storage and maintenance of secure information (e.g., certain user information, security features, etc.) and/or non-secure information (e.g., transaction confirmations and information with low level security).

For example, software running on the processing unit 240 is coded to coordinate communications between the device driver 270, tertiary device drivers 275 and the wireless transceiver 260 for transmitting/receiving information and maintaining any kind of signaling between them. Likewise, additional software may be used to generate various menus, which allows the user to select and activate or inactivate various features of the portable unit 150.

As an additional example, the processing unit 240 may execute software that is responsible for handling cryptographic (e.g., encryption, decryption, etc.) and other security-based operations. These operations maintain secure transactions and secure storage through verification of data integrity and authentication of the user.

As another example, the processing unit 240 may execute software that is responsible for electronic mail (e-mail) and web processing. All the communication protocol processing and transaction processing required for email/web access and electronic commerce is performed by the processing unit 240, including addressing all the security requirements while performing transactions online.

Yet another example, the processing unit 240 may execute software that is responsible for sending and receiving secure and insecure digital files. This allows authenticated users of the portable unit 150 to receive files from providers (e.g., financial institutions or their web sites, etc.). This also allows for transferring files from the portable unit 150 via I/O interface 280 and/or wireless transceiver 260 to the various POS systems and ATMs, for processing user transactions.

Yet even another example, the processing unit 240 may execute software that is responsible for establishing wireless communications with an electrical or electromechanical locking mechanism. These communications may be used to upload a code to lock/unlock the locking mechanism. The code may be one or more digital signals, one or more analog signals modulated within a selected frequency range, optical signals (e.g., series of infrared pulses or laser) and the like. It is optional that the communications involve the exchange of cryptographic materials such as keys, digital signatures and/or digital certificates. The code may be stored within (i) protected areas 251 of internal memory 250, (ii) tertiary devices 295, (iii) the remote control transceiver 288 or (iv) any combination thereof.

As a further example, the software running on the processing unit 240 is responsible for receiving, programming, storing, accessing and utilizing unique remote control code(s). The software controls the digital remote menu functions and controls the accessing and retrieval of stored remote control code(s). The software is also responsible for accessing the appropriate remote code(s) from protected areas of internal memory 250 and/or tertiary devices 295 and sending those code(s) to the remote control transceiver 288 via the device driver 270 and/or tertiary device drivers 275. When the remote control transceiver 288 within the portable unit 150 releases the appropriate code(s), the remote control locking mechanism, whether built into an automobile, home, office or garage door, will lock/unlock.

It is contemplated that the electrical or electromechanical remote locking mechanisms built into the home, office or garage door may have suitable connectivity to telephone lines or electrical lines. This may enable the remote control transceiver 288 in the portable unit 150 to transmit the remote code(s) via wireless and/or land based telephone lines to the locking mechanism. Thus, control of the locking mechanism may be performed remotely.

Various peripheral systems may be placed in communication with the portable unit, including but not limited or restricted to POS, ATM or locking mechanisms. These peripheral systems will also be loaded with application software, system software and/or communication software that is required to communicate with the portable unit and its applications.

The processes described in FIGS. 4-16 below, when implemented in software, are programs (applications, applets, routines or sub-routines) that perform tasks. The programs can be stored in machine-readable medium. The "machine readable medium" may include any medium that can store or transfer information. Examples of machine readable medium include an electronic circuit, a semiconductor memory device, a read only memory (ROM), a flash memory, an erasable programmable ROM (EPROM), a floppy diskette, a compact disk (CD-ROM), an optical disk, a hard disk or a fiber optic medium.

Figure 4:
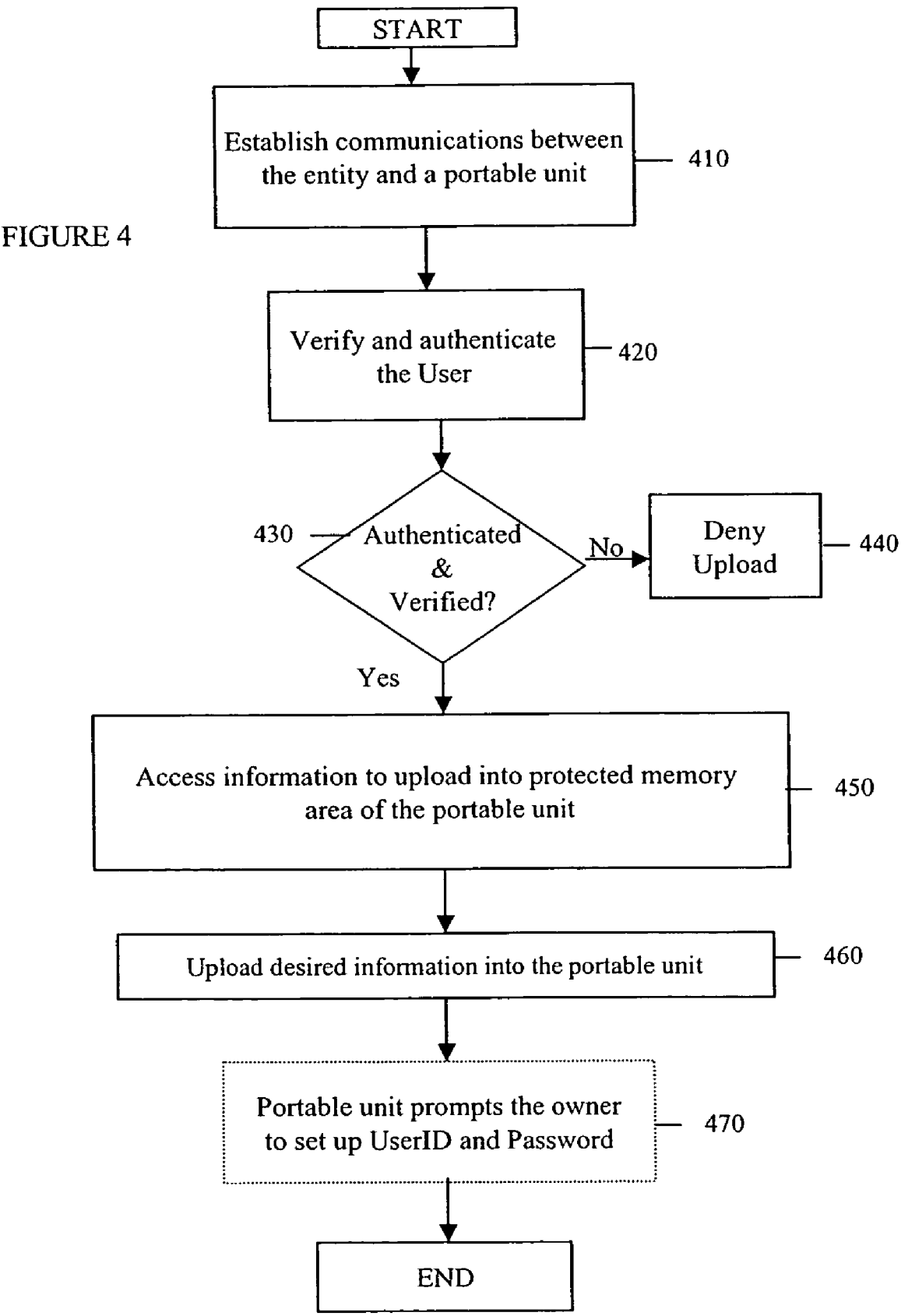
FIG. 4 is an exemplary embodiment of a process for uploading user information from an entity into a portable unit.

Referring now to FIG. 4, an exemplary embodiment of a process for uploading information into a portable unit from an entity is shown. In general, the "entity," as referred to herein, may be a governmental agency, a financial institution, a commercial enterprise, a non-profit enterprise, a kiosk and the like. The user of the portable unit establishes communications with the entity (block 410). For example, the user may physically take the portable unit along with his or her identification (e.g., drivers license, credit card, etc.) to an office/kiosk of the entity. An authentication agent (e.g., an employee of the entity, kiosk computer itself, etc.) verifies and authenticates the user of the portable unit (block 420). Such verification and authentication may be accomplished through any identification process (e.g., handwritten signature verification with accompanying identification such as a drivers license, social security number or mother's maiden name, password entry, biometrics, digital signature/certificates, etc.).

If the information maintained or accessible by the entity does not match the information provided by the user, the requested upload is denied and is not conducted (blocks 430 and 440). However, if the information matches the maintained information, the authentication agent accesses the desired information and uploads the information for storage in protected, non-volatile memory of the portable unit (blocks 450 and 460). It is contemplated, however, that the uploaded information may be stored in the internal memory and/or in the tertiary devices. The user of the portable unit is not allowed to make any changes to any uploaded information. Instead, the portable unit prompts the user to optionally set up a UserID and password for subsequent access attempts (block 470).

Figure 5:
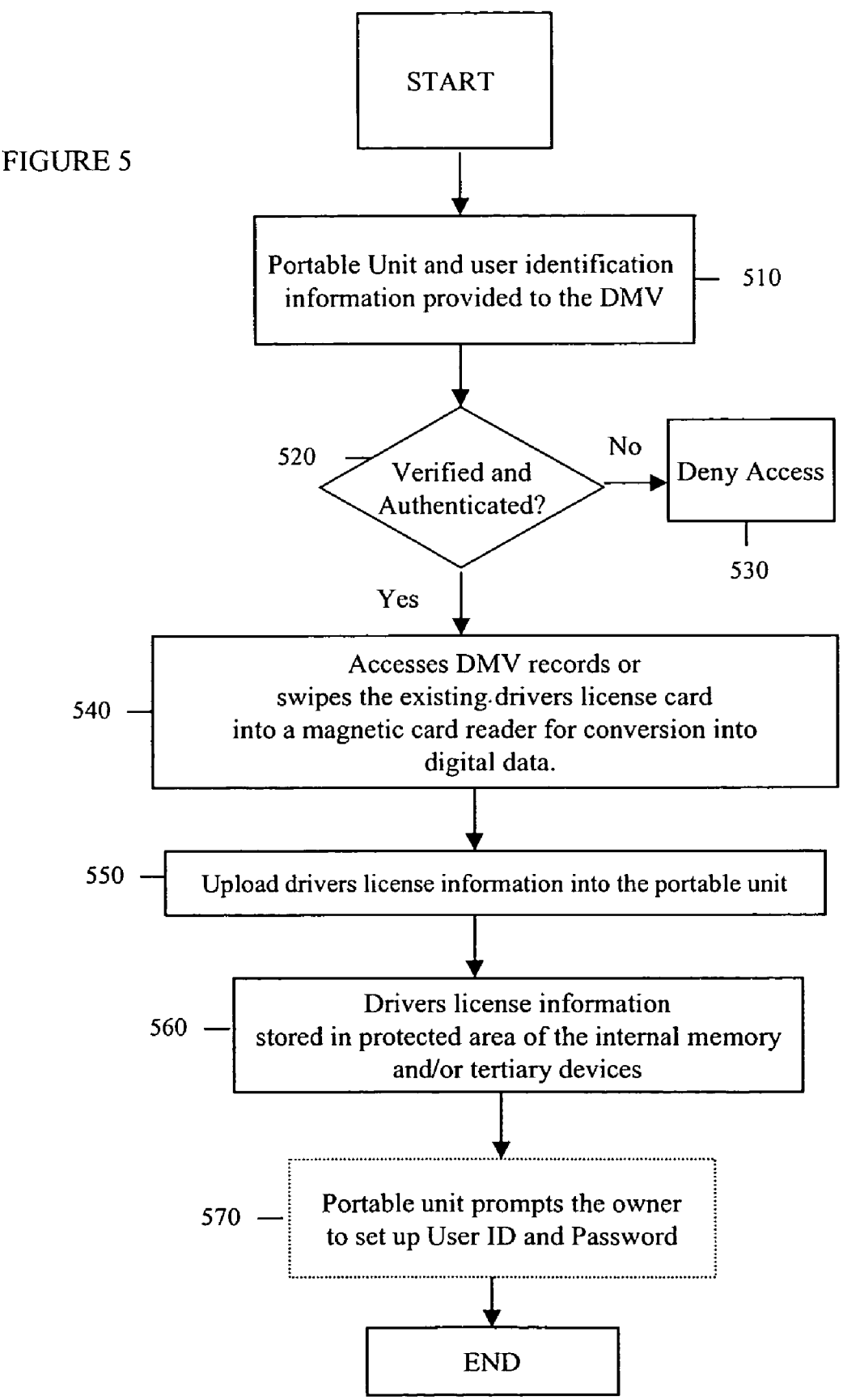
FIG. 5 is an exemplary embodiment of a process for uploading drivers license information to a portable unit.

Referring now to FIG. 5, an exemplary embodiment of a process for uploading user information from an entity, specifically drivers license information from the Department of Motor Vehicles "DMV" to a portable unit is shown. The owner of the portable unit establishes communications with the entity by physically delivering the portable unit along with his or her current drivers license to a clerk at the DMV (block 510). The DMV clerk verifies and authenticates the user of the portable unit (block 520).

If the DMV records match the user identification information provided by the user, an authorized DMV clerk accesses the DMV records and uploads the complete drivers license information into protected memory. The "protected memory" includes protected area of the internal memory and/or protected area of tertiary devices of the portable unit (blocks 540, 550 and 560). Herein, the downloaded drivers license information includes a digital picture of the user, digital picture of the drivers license, a drivers license number, user name, age, date of birth, address, sex, height, weight, color of hair, indication of corrective lenses or any combination thereof.

In order to prevent unauthorized access to the drivers license information, the portable unit may prompt the user to set up a UserID and password for accessing the drivers license information (block 570). The prevention of unauthorized access using the UserID and password is an optional feature exercised by the user as represented by dashed lines.

In general, the entity's computer/s that are authorized to download digital user information into a portable unit would be configured with appropriate software and procedures. The portable unit will also be loaded with appropriate software for receiving, processing and storing information from the entity.

It should be appreciated that a number of other techniques and processes can be easily devised by people skilled in the art for downloading/uploading card information into the portable unit. For example, there are a number of magnetic card readers with different designs and technologies currently available in the market place that can read card information contained in the magnetic strip of these cards. The card may be swiped into the magnetic card reader and the captured information can be converted into a digital format and uploaded into the portable unit. Another example includes placement of the card information into the memory chip of the smart cards that can be read by a smart card reader and converted to digital data and downloaded into the portable unit.

Yet another example for uploading card information into the portable unit is through an independent processing agent that receives cards containing the user information such as drivers license, ATM, credit, debit cards and the like. The independent processing agent may be an independent company, manufacturer, wholesaler, distributor, retailer and/or the service provider for the portable unit. The consumer may provide the cards to the independent processing agent at the time of purchase of the portable unit or at the time of signing up with a service provider or at any subsequent time. The cards may be received either from the consumer or directly from the card issuers or a combination thereof. Thereafter, the card information is converted into digital format and uploaded into the internal memory unit and/or tertiary devices of the portable unit.

Figure 6:
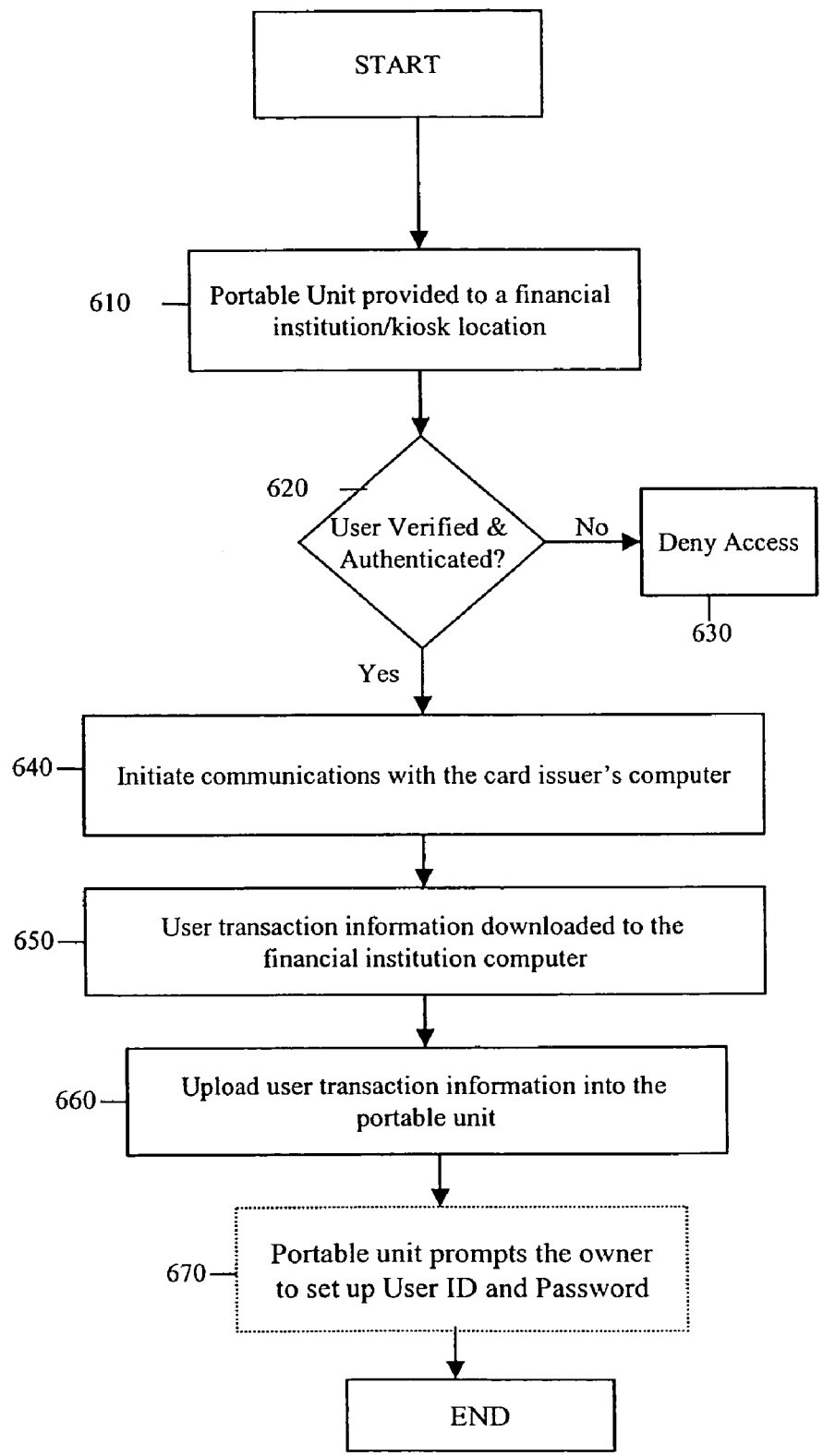
FIG. 6 is an exemplary embodiment of the process of uploading ATM/credit/debit card information via a link between the portable unit and a computer at an authorized financial institution or kiosk location.

Referring now to FIG. 6, an exemplary embodiment of the process of uploading ATM/credit/debit card information via a link between the portable unit and a computer at an authorized financial institution is shown. The user physically takes the portable unit to an authorized financial institution (block 610). An authorized representative at the financial institution verifies and authenticates the user of the portable unit (blocks 620 and 630). This may be accomplished through identification processes as described above.

If the user is verified, then the authorized representative will initiate communications with the card issuer's computer and/or a representative at the card issuer via any communication link such as the Internet, telephone, facsimile machine and the like (block 640). Thereafter, the card information is downloaded to a computer controlled by the financial institution (block 650). This would enable the financial institution to upload the card information into the portable unit or memory associated therewith (block 660).

As an illustrative example, a financial institution issued a credit card to John Doe and John Doe wishes to download the credit card information into his portable unit. John Doe takes his portable unit and his credit card to his bank. An authorized bank representative verifies and authenticates John Doe's identify. Thereafter, upon successful verification, the bank's computer and/or an authorized bank representative communicates with the financial institution's computer and/or an authorized representative from the financial institution and provides appropriate identification and credit card information for John Doe. If the information regarding John Doe provided by the bank matches the information locally accessible by the financial institution's computer, the financial institution will release and upload John Doe's credit card information to a designated bank's computer. Now, the bank can upload the credit card information into John Doe's portable unit. All ATM, credit and debit card information received by the portable unit from any financial institution computer will be stored in secure, protected and non-volatile memory.

The user of the portable unit will not be allowed to make any changes to any card information received from the financial institution and stored in the internal memory and/or tertiary devices of the portable unit. As an optional feature, the portable unit may prompt the user to set up a UserID and password for card information associated with each card stored in internal memory and/or tertiary devices (block 670). Although not shown, it is contemplated that the upload process may be prevented if the UserID and password are not set up in a timely manner.

Figure 7:
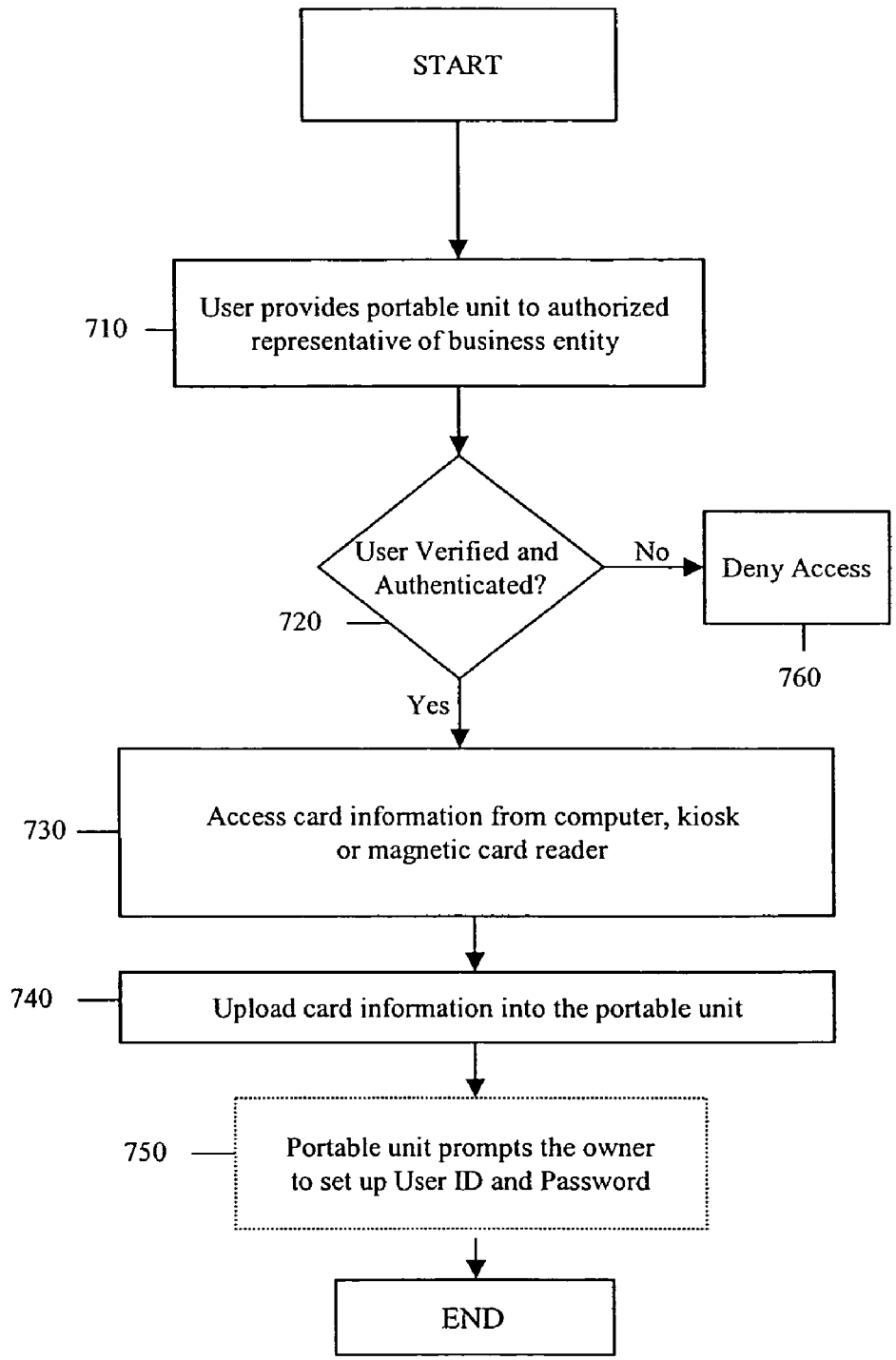
FIG. 7 is an exemplary embodiment of the process of uploading credit, debit and other identification cards issued by a business entity such as an authorized department store, library or gym into the portable unit of FIG. 3.

Referring now to FIG. 7, an exemplary embodiment of the process of uploading card information for cards issued by a business entity is shown. The upload is performed by physical connectivity between the portable unit and the issuer's computer. The user provides the portable unit to an authorized representative of a business entity. The "business entity," as generally referred to herein, may be a commercial enterprise as described above such as a retail store, a department store, a library, a school, a gym, a kiosk and the like (block 710). An authorized representative at the business entity that honors the card verifies and authenticates the user of the portable unit (block 720). If the user is verified, then the authorized representative uploads the card information to the internal memory and/or tertiary devices of the portable unit (blocks 730 and 740). Otherwise, the upload process may be prevented (block 760). Thereafter, a UserID and password may be optionally established (block 750).

Occasionally, the issuer may have to communicate via Internet, satellite etc. with the card issuer's central computer and/or a representative at the actual card issuer's central office and download the card information from the issuer's central computer to the computer at the location of the business entity. The business entity can then upload the card information to the portable unit either to the internal memory and/or the tertiary devices.

As an alternative embodiment, although not shown, the card information may be recovered from a magnetic card reader that can read and capture information encoded into the magnetic strip of a card. The captured information can be converted into digital format and downloaded into the portable unit. Similarly, card information contained in a memory chip of a smart card can be read by a smart card reader and converted to digital data and downloaded into the portable unit.

Figure 8:
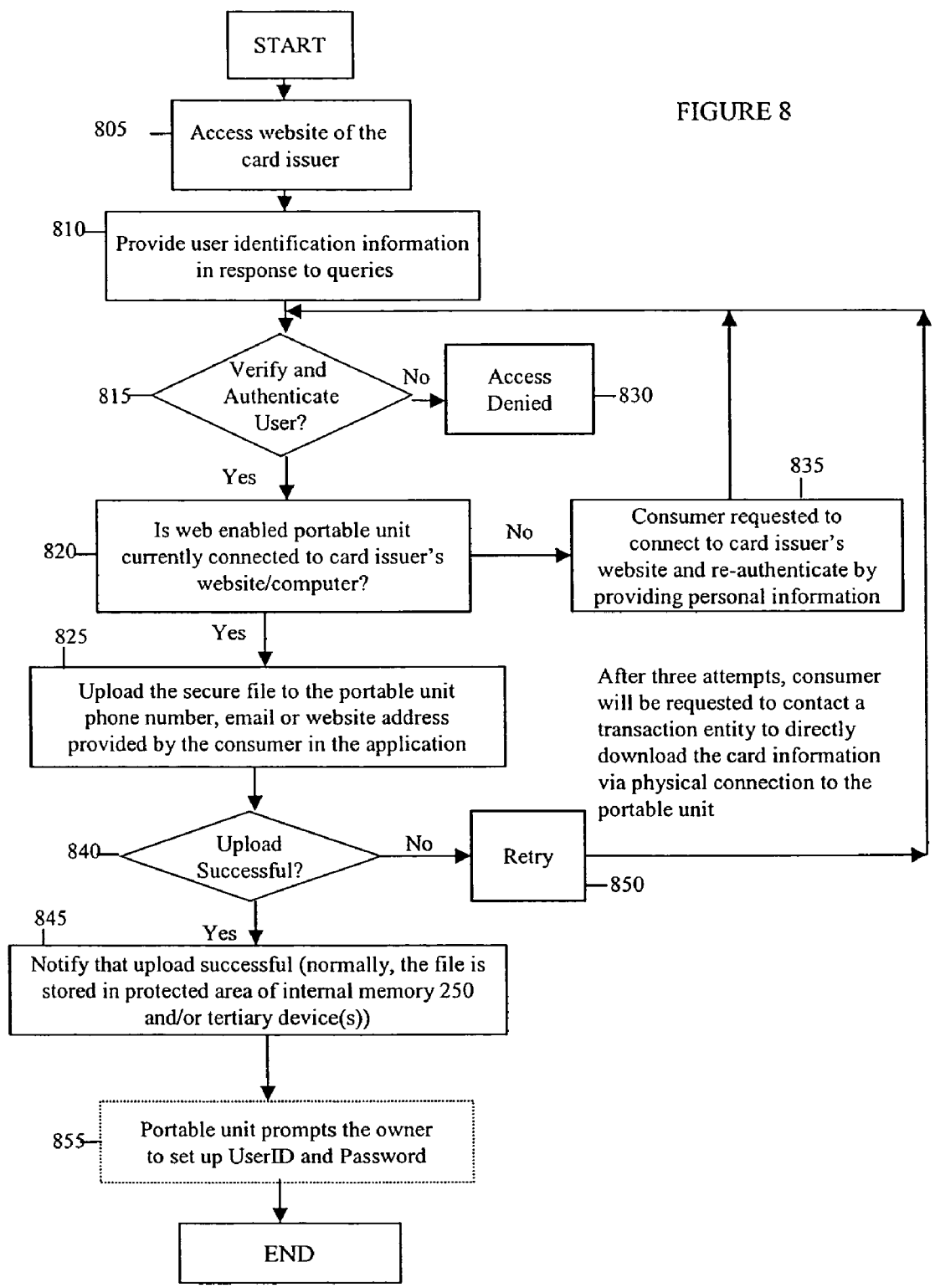
FIG. 8 is an exemplary embodiment of the process of uploading card information remotely via wireless, satellite, Internet or another link type into the portable unit of FIG. 3.

Referring to FIG. 8, an exemplary embodiment of the process of uploading card information (e.g., drivers license information, ATM/credit/debit card numbers and expiration dates, store credit card number, etc.) remotely via wireless, satellite, Internet or another link type is shown. The user accesses the website of the card issuer from a web-enabled portable unit or a Plain Old Telephone System (POTS) telephone (block 805). When the user dials into the card issuer's website, the user may be prompted to provide identification information such as mothers maiden name, social security, unique portable unit identifier, phone number of the portable unit, and the like (block 810). The process of matching the provided identification information with pre-stored information or any other process for verifying and authenticating the user and their portable unit prior to uploading a digital card file (e.g., digitized information normally placed on the face of or stored in a ATM, credit or debit card and also referred to as card information) remotely via wireless, Internet or any other communication pathway may be performed.

For example, the user may have provided his/her mother's maiden name, social security number, phone number/web address of the portable unit, user's primary electronic mail (e-mail) address, unique portable unit identifier. This information may be included in the application submitted for obtaining the original paper, plastic, digital and/or smart card. This personal information is already stored in databases accessible by the issuer.

If the personal information provided by the user at the time of downloading the digital card file matches with the information submitted with the application (which has already been processed and approved by the card issuer), then the card issuer authenticates the user and his or her portable unit and starts the uploading process remotely via Internet, satellite, etc. (block 815). The digital card file will be uploaded either to the portable unit user's primary e-mail address or Internet website address (generally referred to as "Internet Protocol (IP) address") or directly to their portable unit as selected (blocks 820 and 825). Otherwise, access is denied (block 830).

The portable unit is loaded with software that enables the user to upload the digital card file from the issuer's website and/or e-mail to his or her portable unit. The digital card file to be downloaded via Internet, wireless etc. may be encrypted and may include some or all of the personal information such as the phone number of the portable unit, e-mail address, and unique portable unit identifier. This personal information ensures that the digital card file is being transmitted to an authorized recipient. Otherwise, a request is issued to connect to the card issuer's website and begin re-authentication (block 835).

Once the uploading is successful and complete, the portable unit will automatically notify the card issuer's computer (blocks 840 and 845). If the upload is not successful, the portable unit will initiate the upload process again and after three attempts, the card issuer's computer may prompt the portable unit user to visit a physical branch or location to upload the digital card file via direct connectivity to a computer at the branch/location (block 850). If the digital card file is uploaded to an e-mail or website address, the program may be written to allow uploading to the portable unit from the e-mail or website address only a certain number of times and then automatically destroy the file after uploading a specified number of times as requested by the user. This will ensure that the digital card file may not be stolen, copied or downloaded from the e-mail or website address into unauthorized portable units.

Once the digital card file is downloaded into the portable unit, the processing unit programs the information received and stores it either in the internal memory and/or in the tertiary devices. As an option, the portable unit may prompt the user to set up his or her UserID and password for each digital card file received and stored in the portable unit (block 855).

Just as issuing multiple cards having the same card number and expiration date but different names (e.g., same corporate name and card number but different employee names), digital card files can be uploaded to multiple portable units. The same process described above may be used for uploading into each portable unit either remotely or via direct link to a computer at an entity.

Figure 9:
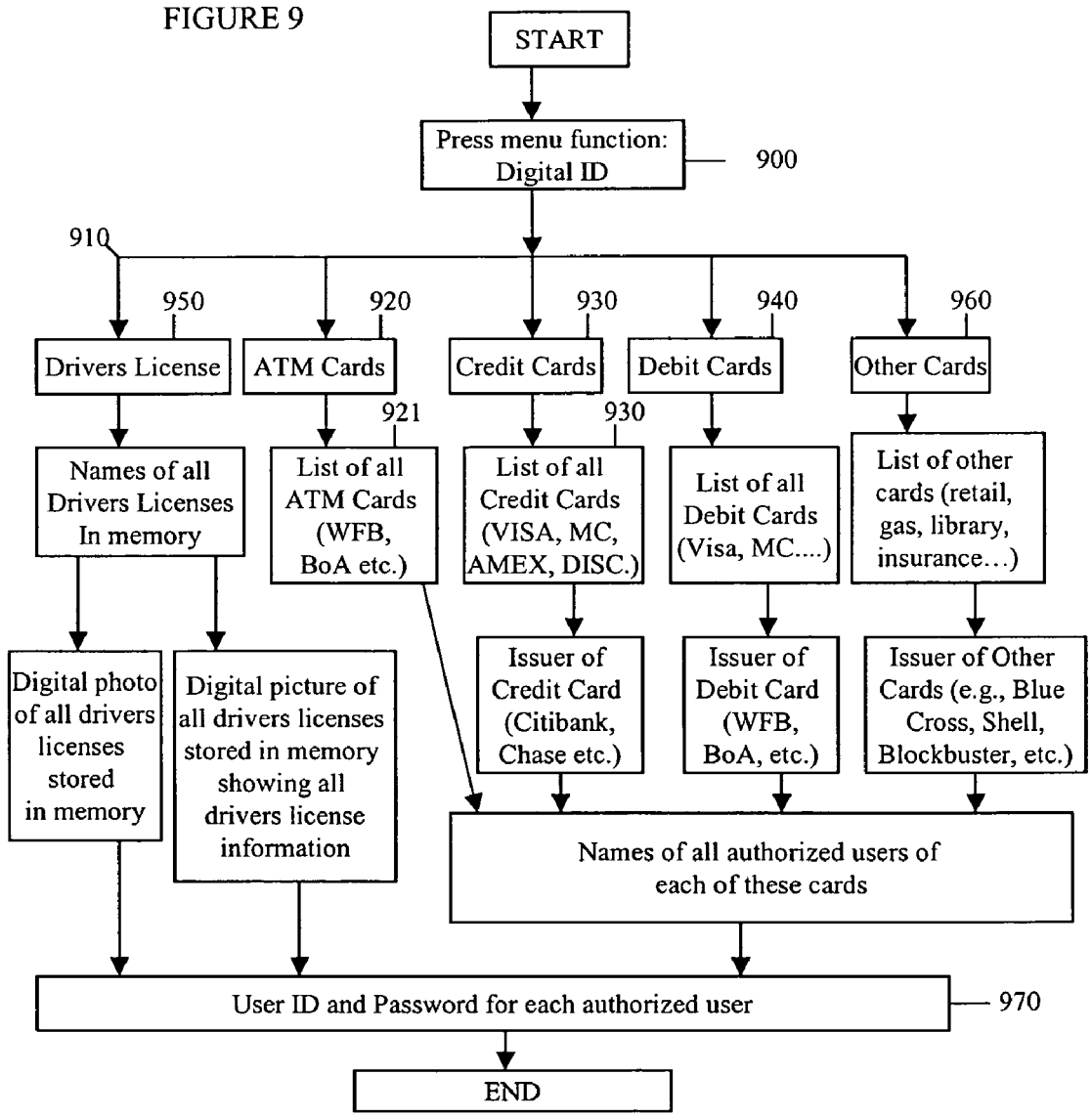
FIG. 9 is an exemplary embodiment of a digital ID menu function and sub-features that will be added to the portable unit of FIG. 3.

Now that the digital card file is uploaded into the portable unit, the user needs to access and utilize the digital card information stored in the portable unit for identification and other commercial transactions. FIG. 9 illustrates the various menu functions and features to be built into the portable unit for accessing and utilizing the digital identification, digital cards, digital remote control keys and the like. It is contemplated that these menu functions and features may also be set up as additional function keys, new buttons, etc.

In particular, FIG. 9 illustrates an exemplary embodiment of a process for digital ID menu function 900 and sub-features added to the portable unit. Various features and choices are provided under each new sub-function. When the user presses the menu and selects a particular function or feature, the selected function or feature is activated. Each function/feature may have further sub-functions and sub-features. For example, various sub-functions 910 under digital cards include ATM 920, credit cards 930, debit cards 940, drivers license 950 and other cards 960. Under each sub-function, the user may be given various choices such as the ATM sub-function 920 featuring a list of all ATM cards 921 owned by the user. The user can scroll down the appropriate ATM card and activate that digital card file by inputting the UserID and/or password. The activation enables the card information to be downloaded from the portable unit or shown on its display. Similarly, the credit card sub-function 930 provides a listing of all credit cards owned by the user. Under each of these sub-functions, further choices may be available to the user.

Referring still to FIG. 9, the user may have further choices as to the payee such as John Doe (husband), Jane Doe (wife), John Doe, Jr. (son) and the like. Multiple digital cards with the same number but different names may be stored in the portable unit. This accommodates for the situation when the same portable unit may be used by husband, wife and children at different times. Note that each of these digital cards may be protected by their own unique UserID and password so that a child using the portable unit cannot access/use his or her father's card that may have a higher credit limit without his/her father's authorization (block 970).

Figure 10:
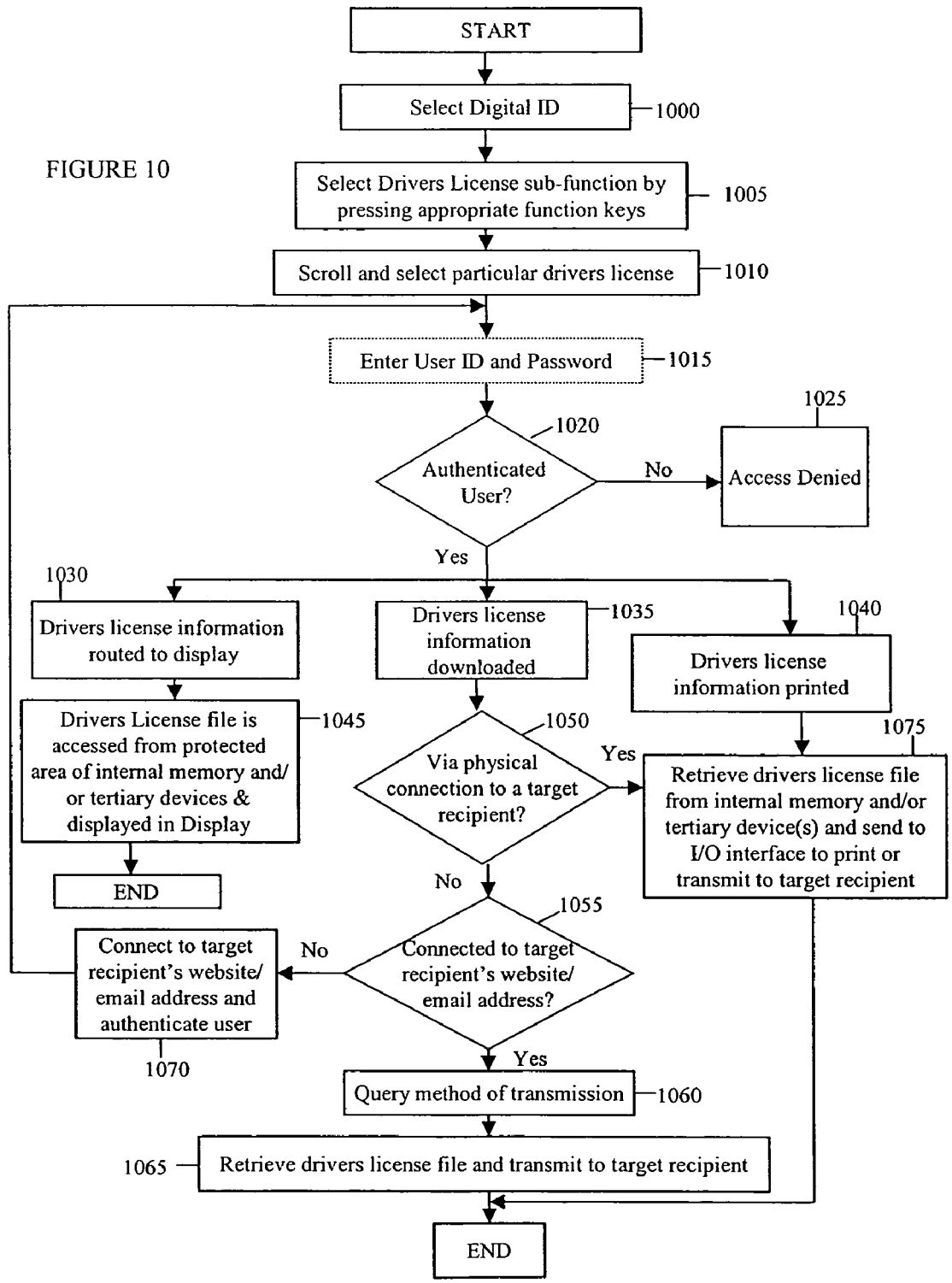
FIG. 10 is an exemplary embodiment of the process by which a user accesses and utilizes a digital drivers license already downloaded and stored in the portable unit of FIG. 3.

FIG. 10 illustrates an exemplary embodiment of the process by which a user accesses and utilizes a digital card file such as a digital drivers license already downloaded and stored in the portable unit. When the user scrolls down and presses the appropriate function key to select the "Digital ID", the portable unit will display the various sub-functions such as digital drivers license, digital social security, and the like (block 1000). When the user selects the sub-function digital drivers license (block 1005), the names associated with all digital drivers licenses stored in the portable unit will be displayed. The user scrolls down to select the appropriate digital drivers license name, selects the particular drivers license and optionally enters the UserID and password (blocks 1010 and 1015). If the UserID and password for the selected digital drivers license name matches information prestored in the portable unit (block 1020), the portable unit accesses the digital drivers license information stored either in internal memory and/or tertiary devices. This information is routed to either the display, wireless transceiver/antenna or the I/O interface, per user's request. Otherwise, access is denied (block 1025).

When the user selects a particular digital drivers license name, the portable unit may give several choices, including Display, Upload, or Print (blocks 1030, 1035 and 1040). If the user selects "Display", it is contemplated that the information pertaining to a portion or entire digital drivers license may be accessed from internal memory and/or tertiary devices for display (block 1045). This information includes one or more of the following: (i) a digital picture, (ii) drivers license number, (iii) name, (iv) address, (v) date of birth, (vi) sex, (vii) hair color, (viii) eye color, (ix) height, (x) weight, (xi) expiration date, and/or (xii) a designation of corrective lenses. The information may be displayed in just one screen or separately in multiple screens depending on the size of the screen, size of fonts in the display, size of the memory and the like. It is further contemplated that the user may be able to control the size, font and clarity of the display by displaying all information in one or multiple screens (such as the digital picture in one screen and the drivers license information in another screen).

If the user chooses "Download", the user is provided with options for downloading the drivers license information from portable unit. These options include (i) physical connectivity (block 1050) (ii) electronic mail (e-mail) or website address (block 1055). For instance, if the user chooses to upload the digital drivers license information via e-mail or website, the portable unit queries the user for further information such as e-mail and/or website address, method of transmission (e.g., satellite, Internet, etc.) as shown in block 1060. The selected information to be downloaded is routed to the I/O interface 280 or wireless transceiver 260 and transmitted via antenna 200 to the appropriate e-mail, Internet or website address via the method of transmission selected by the user (block 1065). This will enable the user to send a copy of their digital drivers license to a third party and facilitate various personal and commercial transactions. Otherwise, a connection is made and the authentication and operation selection repeats (block 1070).

As an example, in the event that an entity (e.g., an authorized law enforcement agency personnel) wants access to a digital drivers license stored in the portable unit, the user may display the entire digital drivers license on the display of the portable unit. Alternatively, another portable unit/computer with suitable physical connectivity to the portable unit may be adapted to read the digital drivers license from the portable unit. Yet, another alternative approach is to upload the digital drivers license as a read only file for purposes of storing/printing as a data file only. It is contemplated, however, that the system architecture and/or software of the portable unit may be configured to prevent a digital drivers license or any other user information to be uploaded from one portable unit to another unless the other unit is a portable reader $130_X$ in possession of an authorized entity (e.g., card issuer, agent of the issuer, law enforcement, etc.).

If the user chooses the "Print" option, then the digital drivers license is sent to the I/O interface and can be printed directly from the portable unit (if a printer is built into the portable unit) or through an external printer (blocks 1040 and 1075).

Figure 11:
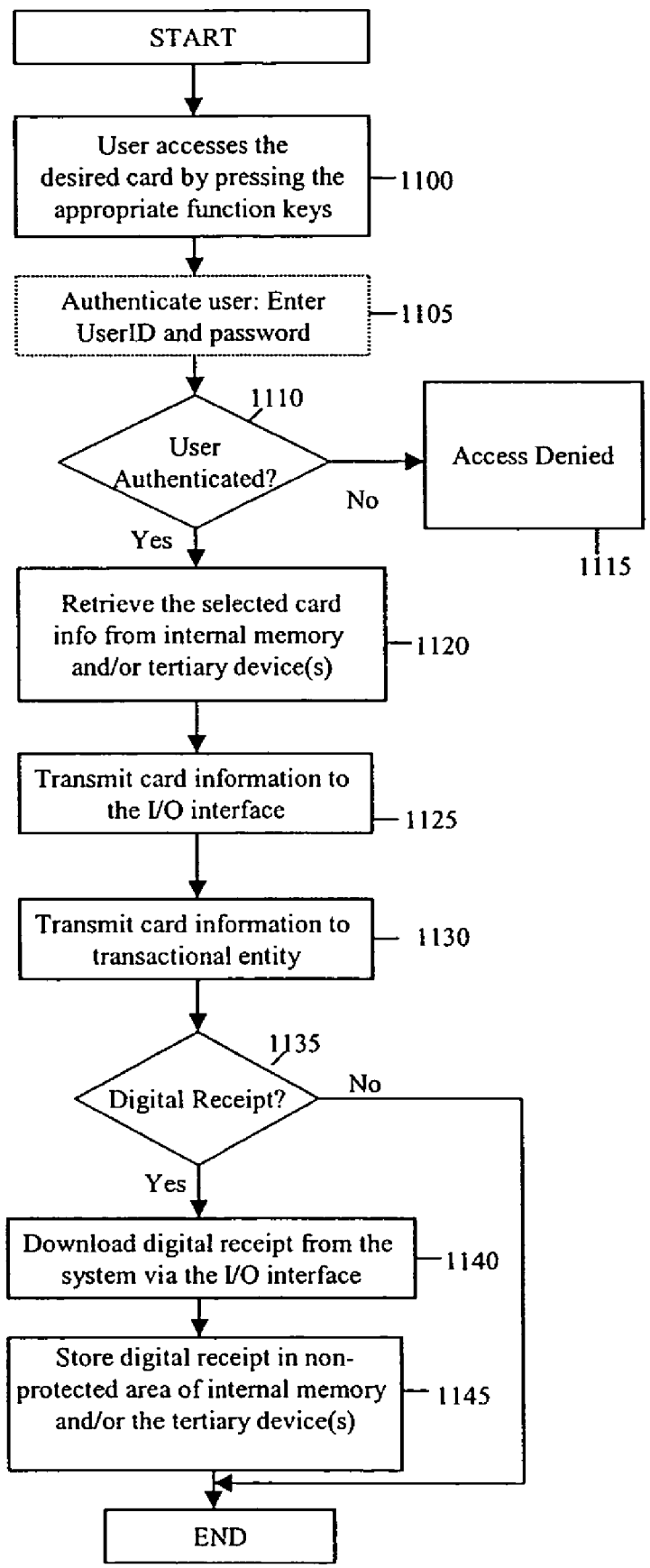
FIG. 11 is an exemplary embodiment of the process of accessing and utilizing the digital ATM, credit and debit cards for various Point-of-Sale (POS) transactions.

Referring now to FIG. 11, an exemplary embodiment of the process of accessing and utilizing card information associated with an ATM, credit and debit cards for various transactions is shown. Of course, the digital card file(s) pertaining to the ATM, credit and debit cards have been previously downloaded and stored in protected areas of internal memory and/or tertiary devices as read only file(s). The user scrolls down the menu function and selects the function titled, "Digital Cards" and scrolls down the various choices and selects an appropriate digital card (ATM, credit or debit card) for a transaction (block 1100).

The portable unit prompts the user to optionally enter the appropriate UserID and password for the selected digital card as represented by dashed lines (block 1105). If the UserID and/or password entered by the user does not match with the user information stored in internal memory and/or tertiary device(s), the portable unit will reject access and perhaps display "Access Denied" on its display (blocks 110 and 1115). If the UserID and password matches the user information stored in memory, the portable unit will access the appropriate read-only digital card file from internal memory and/or tertiary device(s) and transmit the card information to the I/O interface (blocks 1110, 1120 and 1125).

A suitable connectivity between a transactional entity and the I/O interface of the portable unit is configured to enable proper communication between the transactional entity and the portable unit. The "transactional entity," as referred to herein, may be an ATM of a financial institution, a POS system, a computer at an entity, a portable computer, another portable unit configured as a reader, a kiosk and the like. The card information (e.g., name of the card, card number, full name on the card, expiration date, etc.) that is necessary for processing the transaction will be transmitted to the transactional entity via the I/O interface (block 1130). It is contemplated that the transactional entity will be set up with appropriate software/hardware to receive the ATM, credit or debit card information digitally via the I/O interface of the portable unit in addition to receiving the card information via the magnetic/smart card reader.

Once the ATM, credit or debit card information is transmitted to the transactional entity, the transactional entity will process and complete the transaction the same way it is processed currently in the market place. In today's transactions, the magnetic card reader reads the information contained in the magnetic strip of the plastic cards and the transactional entity processes and completes the transaction. Similarly, the portable unit will transmit/release all the necessary card information to the transactional entity digitally via the I/O interface or through wireless communication techniques, and the transactional entity will process and complete the transaction.

A physical copy of the receipt may be downloaded by the transactional entity to the portable unit, showing the final debited or credited amount. In one embodiment, this may be accomplished by the transactional entity initiating a query to the portable unit to determine if the user requests a digital receipt (block 1135). If the user responds "Yes" by pressing the appropriate key, then a digital receipt of the transaction may be downloaded from the transactional entity to the portable unit for storage in non-protected area of the internal memory or tertiary device(s) as shown in blocks 1140 and 1145).

Figure 12:
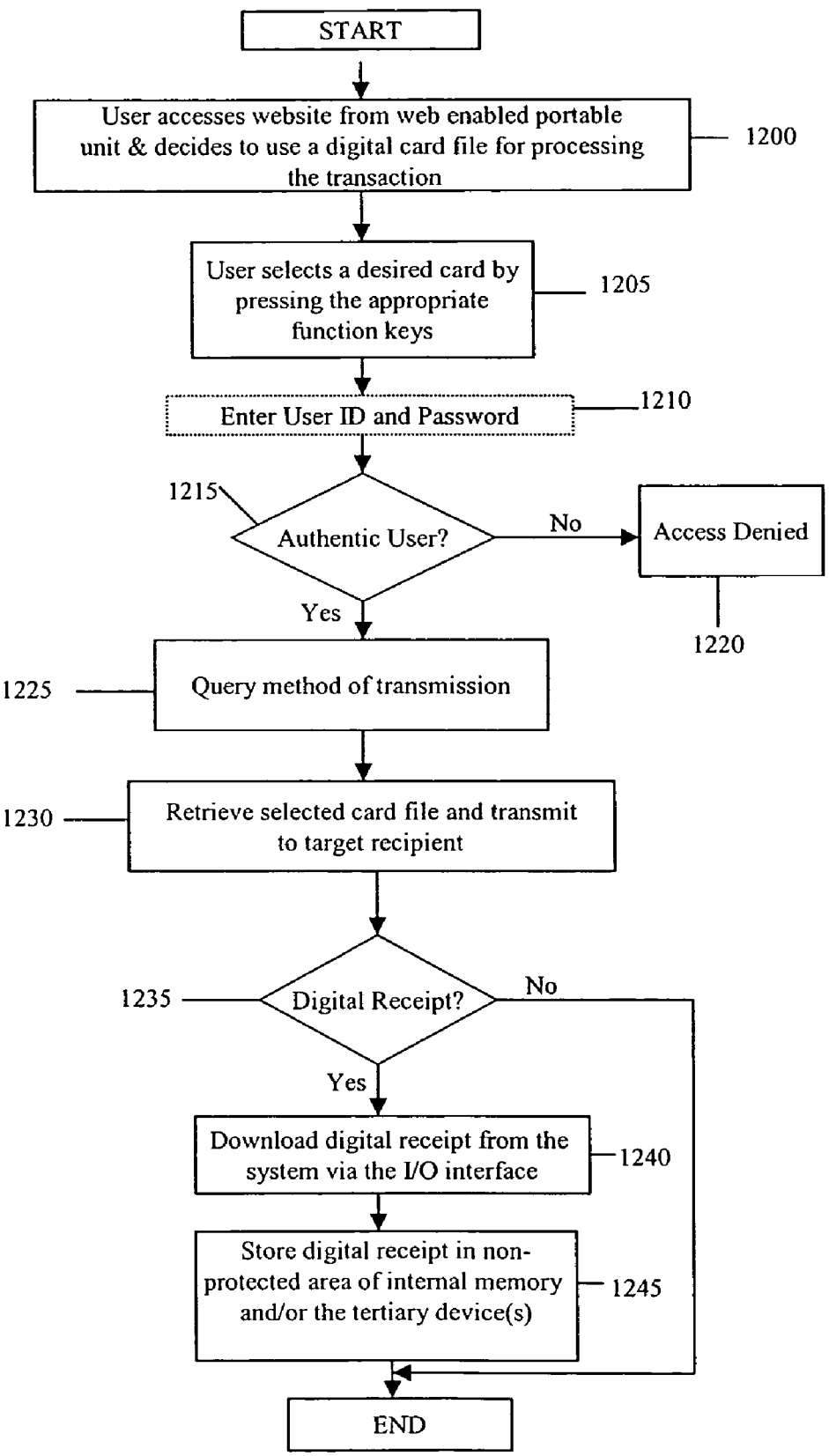
FIG. 12 is an exemplary embodiment of a user accessing and utilizing the digital card information stored in the portable unit for processing a wireless transaction over the Internet.

Referring to FIG. 12, an exemplary embodiment of a process for a user accessing and utilizing the card information stored in the portable unit for processing a wireless transaction over the Internet/satellite is shown. Herein, using the portable unit, the user accesses a website and scrolls through the website, processes a transaction (such as buying an item from the website etc.) and decides to use a digital card stored in the portable unit for processing the transaction (block 1200). The user scrolls down the function keys and selects a digital card (block 1205) and optionally enters the UserID and password as represented by dashed lines (block 1210). If the UserID and password are incorrect, the portable unit rejects the transaction and perhaps displays "Access Denied" (blocks 1215 and 1220).

If the UserID and password matches with the information stored in the portable unit, the portable unit queries the user for further information such as method of transmission (e.g., satellite, Internet, etc.) as shown in block 1225. The selected information to be downloaded is routed to the I/O interface or wireless transceiver and transmitted via an antenna to the appropriate e-mail, Internet or website address via the method of transmission selected by the user (block 1230).

A physical copy of the receipt may be downloaded by the target recipient to the portable unit, showing the final debited or credited amount. In one embodiment, this may be accomplished by the target recipient initiating a query to the portable unit to determine if the user requests a digital receipt (block 1235). If the user responds "Yes" by pressing the appropriate key, then a digital receipt of the transaction may be downloaded from the target recipient to the portable unit for storage in non-protected area of the internal memory or tertiary device(s) as shown in blocks 1240 and 1245.

Figure 13:
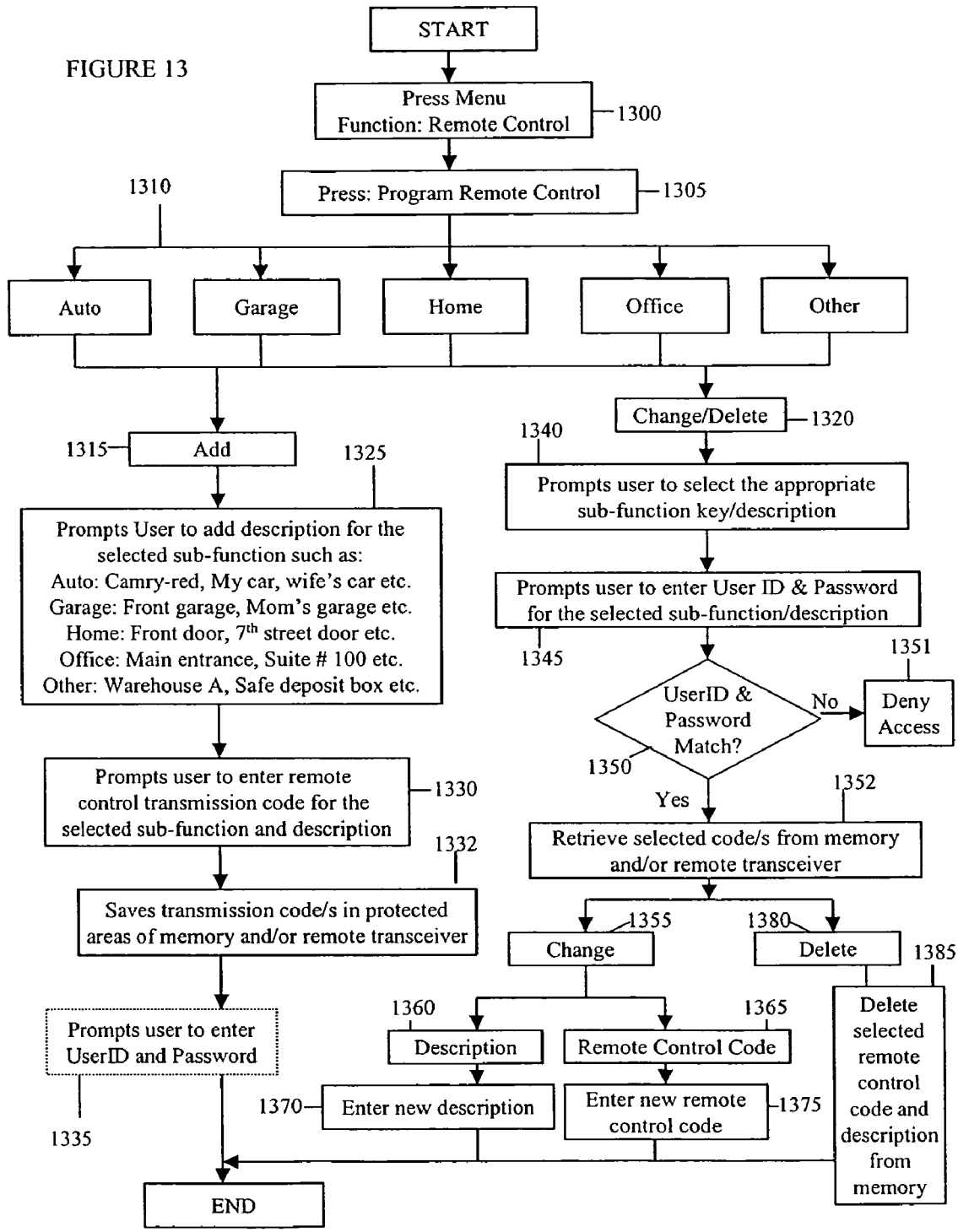
FIG. 13 is an exemplary embodiment of the programmability of the remote control transmission codes into the portable unit.

Referring now to FIG. 13, an exemplary embodiment of a process for a user programming the remote control code(s) into the portable unit is shown. When the user presses the menu function "remote control" and chooses the "program" option, the portable unit displays a list of controllable items such as auto, garage, home, office or other categories (blocks 1300, 1305, 1310). For each selected choice, the user is provided additional choices such as "add" or "change/delete" (blocks 1315 and 1320).

For example, if the user chooses a controllable item and "add", the portable unit prompts the user to add an alphanumeric description for the selected item (block 1325). The portable unit then prompts the user to enter the appropriate remote control transmission code for opening/closing the selected item (block 1330). The portable unit saves the remote control transmission code/s in protected areas of memory and/or remote transceiver (block 1332). The user then enters the UserID and password, if desired (block 1335).

It is appreciated that there are numerous types of electromechanical garage door openers with different kinds of technologies based on different data delivery techniques. A simple and commonly used garage door opener is based on matching codes/frequencies between the remote control and locking mechanism. It is contemplated that the portable unit will be loaded with proper software/hardware that will convert the digital remote control code(s) into appropriate transmission formats necessary for communication with the locking mechanism.

FIG. 13 further shows the process of changing/deleting remote control codes and descriptions already stored in the portable unit. When the user selects the remote control code or description to be changed/deleted by pressing the appropriate function and sub-function keys, the portable unit prompts the user to enter the UserID and password (blocks 1340 and 1345). If the UserID and password matches the information stored in the protected areas of the internal memory and/or tertiary device(s), the portable unit allows the user to delete or change the existing remote control transmission code and/or description (blocks 1350 to 1385).

Figure 14:
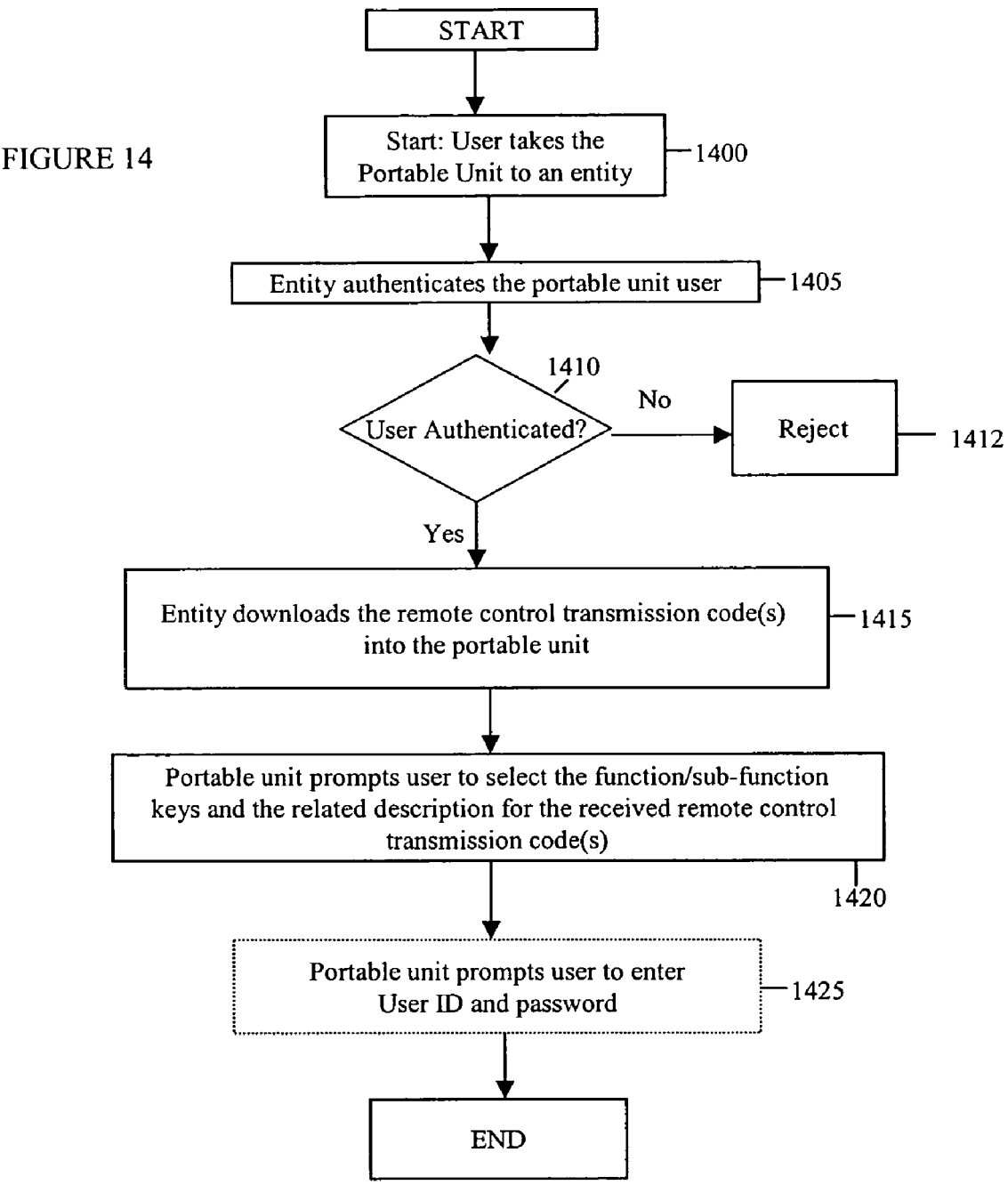
FIG. 14 is an exemplary embodiment of the process of uploading remote control transmission codes/signals into the portable unit via a link.

Referring now to FIG. 14, an exemplary embodiment of a process of downloading remote control code(s) from an entity's computer or other electronic equipment is shown. As shown, in one embodiment, the user provides the portable unit to the entity (block 1400). The entity authenticates the portable unit user by verifying appropriate documents such as drivers license (block 1405). If the user is authenticated, then the entity downloads a remote control transmission code(s) from a computer or other electronic equipment (e.g., programmable universal remote) of the entity into the portable unit (blocks 1410 and 1415). As described above, normally, the remote control transmission code(s) may be stored in internal memory or tertiary device(s) of the portable unit. The portable unit prompts the user to enter a description for each remote control transmission code(s) just received into the portable unit (block 1420). The user then enters a UserID and password, if desired (block 1425).

It is contemplated that the portable unit is loaded with software/hardware for receiving, programming, storing, accessing and utilizing the remote control code(s) into protected areas of the internal memory, tertiary devices and/or remote control transceiver. It is also contemplated that the entity's computer and/or other electronic equipment will also be set up with appropriate software/hardware for uploading the remote control transmission code(s) into the portable unit.

Figure 15:
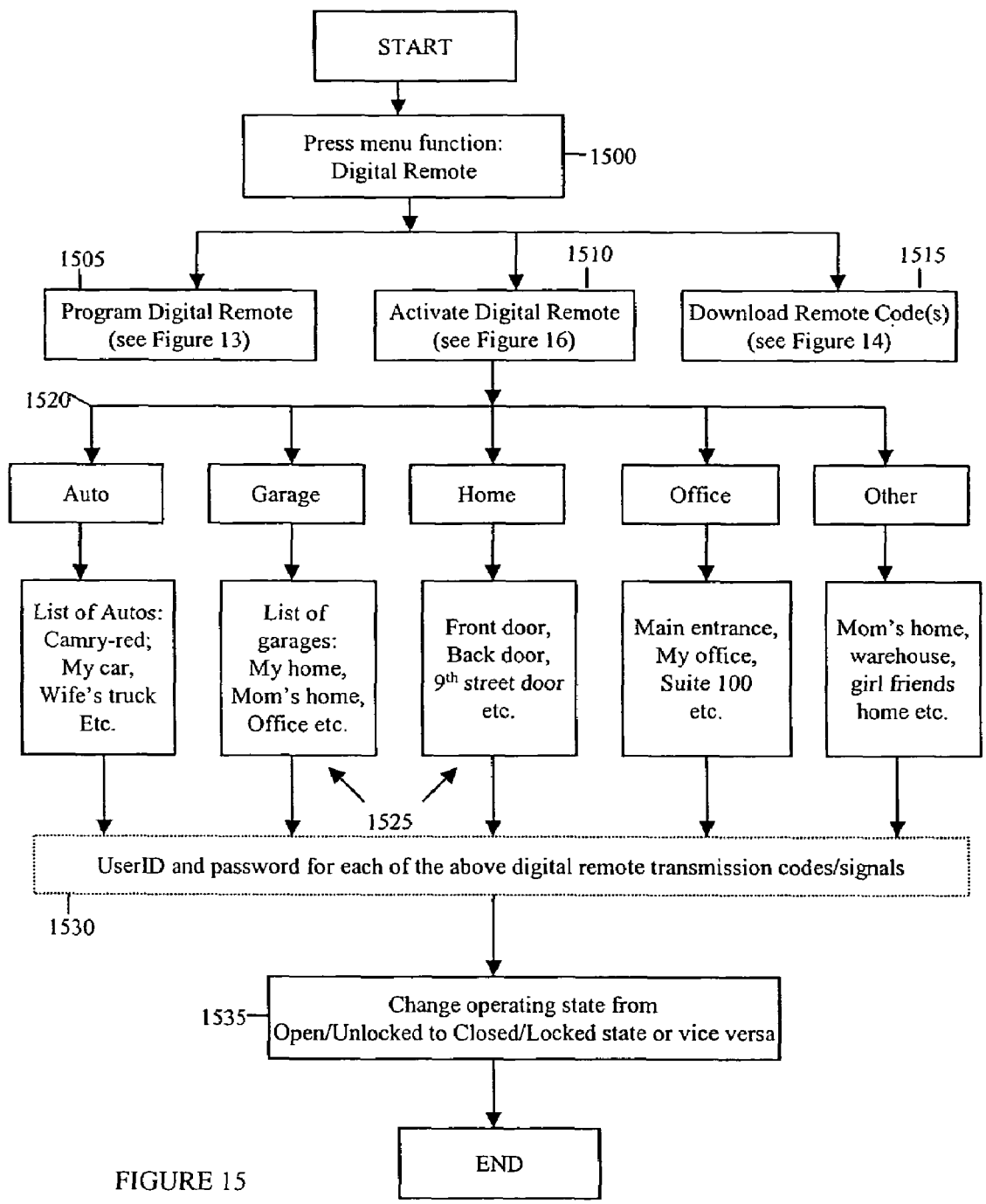
FIG. 15 is an exemplary embodiment of a digital remote menu function and sub-features employed by the portable unit of FIG. 3.

FIG. 15 illustrates the various menu functions and features that will be added to the portable unit for accessing and utilizing the remote control transmission code(s). These menu functions may be associated with a selected menu shown on the display or may be provided through the implementation of additional function keys and buttons on the portable unit.

In particular, an exemplary embodiment of a digital remote menu function and sub-features added to the portable unit is shown. Various features and choices are provided under each new sub-function. When the user presses the menu and selects a particular function or feature, the selected function or feature is entered or activated (blocks 1500, 1505, 1510 and 1515). Each function or feature may have further sub-functions and sub-features (blocks 1520). For example, the user may be given various choices under the sub-function "activate digital remote" such as Auto, Garage, Home, Office and/or Other, for example (blocks 1510 and 1520). Under each sub-function, the user may be given various choices such as a list of all autos whose remote control transmission code(s) are stored in the portable unit (blocks 1525). When the user enters the appropriate UserID and password for the selected sub-function and choice, the selected remote control code is activated (blocks 1530 and 1535).

Figure 16:
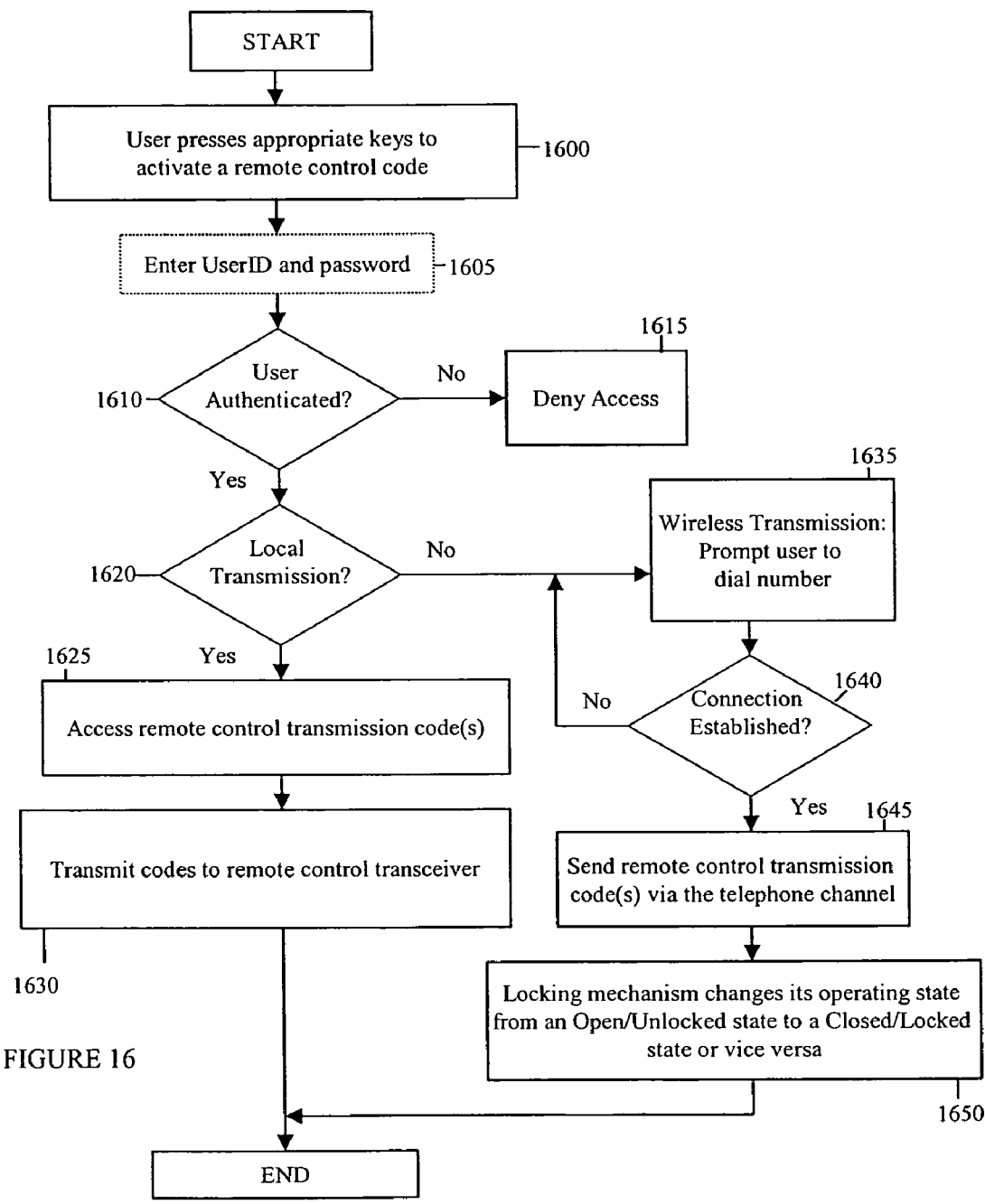
FIG. 16 is an exemplary embodiment of the process by which a user accesses and utilizes the remote control code/signal already downloaded and stored in the portable unit of FIG. 3 for opening/closing various remote control locking mechanisms.

Referring now to FIG. 16, an exemplary embodiment of the process of accessing and utilizing a remote control transmission code for opening/closing a remotely operated locking mechanism is shown. Of course, the necessary remote control code(s) have been previously downloaded or programmed and stored in protected areas of internal memory, tertiary device(s) and/or remote control transceiver as read only file. The user scrolls down the menu function, selects the function titled, "digital remote" and presses the sub-function key(s) to activate the appropriate remote control code (block 1600).

The portable unit optionally prompts the user to enter the appropriate UserID and password for the selected digital remote control transmission code (block 1605). If the UserID and password entered by the user does not match with the user information stored in internal memory and/or tertiary device(s), the portable unit will reject access and perhaps display an alphanumeric message to denote that access is denied (blocks 1610 and 1615). If the UserID and password matches with the stored user information, the portable unit prompts the user whether to transmit the selected remote codes locally or via wireless (block 1620). If the user chooses "local transmission", the portable unit accesses the appropriate read-only, digital remote transmission control code(s) either from internal memory and/or tertiary device(s) and transmits the code(s) to the remote control transceiver (blocks 1625 and 1630). Of course, if the remote control transmission code(s) is stored within the remote control transceiver, the software will authorize the remote control transceiver to release the remote control transmission code(s). When the remote control transceiver releases the appropriate remote control transmission code(s), the locking mechanism (whether built into an automobile door/window, home/office door, garage door etc.) will transfer from an open/unlocked state to a closed/locked state or alternatively from the closed/locked state to the open/unlocked state.

If the user chooses "wireless transmission," the portable unit will prompt the user to dial the telephone number that has connectivity to the locking mechanism (block 1635). If a suitable telephone connection is established, the processing unit will access the selected remote control transmission code(s) from internal memory, tertiary device(s) or the remote control transceiver and send the remote control transmission code(s) via the wireless transceiver and antenna to the locking mechanism via the established telephone channel (blocks 1640 and 1645). The locking mechanism transfers from an open/unlocked state to a closed/locked state or alternatively from the closed/locked state to the open/unlocked state upon receipt of the appropriate remote control transmission code(s) as shown in block 1650.

It is contemplated that the remote control transmission code(s) stored as digital data will be converted to the appropriate transmission formats such as RF, IR, laser and the like, either by hardware and/or software loaded in the portable unit (e.g., the remote control transceiver). It is possible that the remote control transceiver may be configured to internally store all the remote control transmission code(s) rather than store it in the internal memory or tertiary device(s) of the portable unit. It should be appreciated that a number of other techniques, processes and configurations can be easily devised by people skilled in the art for downloading, programming, storing, accessing and utilizing these remote control transmission code(s) into the portable unit for operating various locking mechanisms.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for transmitting information between a hand-held portable unit and an entity, comprising:
   verifying and authenticating a user of the portable unit by the entity located at a first location, the portable unit comprises internal memory including a first area to contain user information; and
   uploading user information into the portable unit only after the user is verified and authenticated by the entity, the user information being subsequently provided by the portable unit to a business entity located at a second location for use during a transaction, the business entity being different than the entity.

2. The method of claim 1, wherein the user information includes a drivers license number of the user and the method further comprises prompting the user to select either displaying, downloading or printing the user information where the display of the user information includes displaying a digital picture of the user, the drivers license number, name and physical characteristics of the user and the downloading of the user information can be restricted to read-only.

3. The method of claim 2, wherein the user identification information further includes a card number and an expiration date from the entity being a credit card issuer and the method further comprises downloading at least the card number to the business entity for use during the transaction being a commercial transaction.

4. The method of claim 1, wherein the verifying and authenticating of the user includes receiving for review user identification information printed on a separate document.

5. The method of claim 1, wherein the uploading of the user information includes accessing records stored on a computer of the entity and uploading the user information into the portable unit via an input/output (I/O) port of the portable unit.

6. The method of claim 5, wherein the uploading of the user information further includes transferring the information into the first area of the internal memory being a protected memory area of the internal memory within the portable unit.

7. The method of claim 5, wherein the uploading of the user information further includes transferring the information into the first area of the internal memory being a protected memory area of a tertiary device within the portable unit.

8. The method of claim 1, wherein the uploading of the user information includes swiping a magnetic stripped card into a magnetic card reader, convening information stored within the magnetic stripped card into digital information and uploading the digital information into the portable unit via an input/output (I/O) port of the portable unit.

9. The method of claim 1, wherein the uploading of the user information further includes swiping a smart card into a smart card reader, convening information stored within the chip of the smart card into digital information and uploading the digital information into the portable unit via an input/output (I/O) port of the portable unit.

10. The method of claim 1 further comprising prompting the user of the portable unit to set up at least one of a user identification and a password after completion of the uploading of the information, the user identification and the password being used to regulate access to the user information within the first area of the internal memory.

11. The method of claim 1 further comprising denying access to the information if the user is unable to be verified and authenticated.

12. The method of claim 1, wherein the entity is one of a financial institution, a governmental agency, a commercial enterprise, a non-profit enterprise and a kiosk.

13. The method of claim 1, wherein the establishing of communications includes establishing an internet connection with a web site of the entity.

14. The method of claim 13, wherein the uploading of the user information includes uploading a file to an electronic mail address or web site accessible by the portable unit.

15. The method of claim 1, wherein the uploading of the user information occurs over the wireless telephone link.

16. The method of claim 1 further comprising uploading of remote codes into the portable unit, if the user is verified and authenticated, includes accessing the remote codes stored on a computer of an entity and uploading the remote codes into the portable unit via an input/output (I/O) port of the portable unit.

17. The method of claim 16, wherein the uploading of the remote codes includes accessing the remote codes stored on a computer of an entity and uploading the remote codes into the portable unit via an input/output (I/O) port of the portable unit.

18. The method of claim 16, wherein the uploading of the remote codes includes uploading the remote codes from a universal programmable remote control.

19. The method of claim 16, wherein the uploading of the remote codes includes manually inputting the remote codes into the portable unit using the keypad.

20. The method of claim 16, wherein the remote codes include a transmission format including at least one of digital signals, one or more analog signals modulated within a selected frequency range, series of infrared pulses, radio frequency, optical signals and laser.

21. The method of claim 16, wherein the uploading of the remote codes includes transferring the remote codes into a protected memory area of an internal memory within the portable unit.

22. The method of claim 16, wherein the uploading of the remote codes further includes transferring the remote codes into a remote control transceiver within the portable unit.

23. A method comprising
authenticating a user of a portable unit, the portable unit comprises a display, a wireless transceiver, a processing unit and a non-volatile memory contained within a casing; and
uploading drivers license information into the portable unit for storage within the memory, the drivers license information includes a digital picture of the user, a user name and a drivers license number; and
restricting access to the drivers license information by displaying the drivers license information on the display of the portable unit when selected by the user or downloading the drivers license information with restricted read-only viewing privileges.

24. The method of claim 23, wherein the uploading of the drivers license information is stored in a protected area of the memory.

25. The method of claim 23 further comprising;
prompting the user to set tip a user identification and a password for accessing the drivers license information.

26. The method of claim 23, wherein the drivers license information is a read only file.

27. The method of claim 23, wherein the drivers license information further comprises a digital picture of a drivers license of the user.

28. The method of claim 23, wherein the drivers license information farther comprises an age of the user, a date of birth of the user, and an indication of corrective lenses.

29. The method of claim 23, further comprises selecting one of a plurality of options to download the drivers license information, the plurality of options include (i) physical connectivity where an input/output port of the portable unit is connected to a device to receive the downloaded drivers license information, and (ii) remote connectivity where the drivers license information is transmitted to an Internet address.

30. A method comprising:
authenticating a user of a portable unit, the portable unit being a cellular phone that comprises a display, a wireless transceiver, a processing unit and a non-volatile memory contained within a casing; and
uploading drivers license information and credit card information for storage within the non-volatile memory, the drivers license information includes a digital picture of the user, a user name and a drivers license number while the credit card information includes a credit card number and an expiration date;
downloading the drivers license information for verification of the user during a commercial transaction after the drivers license information has been uploaded and stored; and
displaying the drivers license information on the display of the portable unit upon request by the user after the drivers license information has been uploaded and stored.

31. The method of claim 30, wherein the uploading of the drivers license information and the credit card information is stored in a protected area of the memory, the protected area of the memory precluding a user from accessing and altering of either the drivers license information or the credit card information.

32. The method of claim 30, wherein the drivers license information is a read only file.

* * * * *